(12) United States Patent
Lin et al.

(10) Patent No.: US 10,448,331 B2
(45) Date of Patent: Oct. 15, 2019

(54) SIGNAL SENDING METHOD, SIGNAL RECEIVING METHOD, AND APPARATUSES

(71) Applicant: Huawei Technologies Co., Ltd., Shenzhen (CN)

(72) Inventors: Wei Lin, Shenzhen (CN); Le Liu, Shenzhen (CN); Jun Zhu, Shanghai (CN); Weishan Lu, Foshan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/471,768

(22) Filed: Mar. 28, 2017

(65) Prior Publication Data
US 2017/0201944 A1    Jul. 13, 2017

Related U.S. Application Data

(63) Continuation of application No. PCT/CN2014/087687, filed on Sep. 28, 2014.

(51) Int. Cl.
*H04W 76/16* (2018.01)
*H04W 24/08* (2009.01)
(Continued)

(52) U.S. Cl.
CPC ....... *H04W 52/0229* (2013.01); *H04L 5/0048* (2013.01); *H04L 5/0053* (2013.01);
(Continued)

(58) Field of Classification Search
CPC .............. H04W 52/0229; H04W 84/12; H04L 5/0053; H04L 5/0048; H04L 27/2613;
(Continued)

(56) References Cited

U.S. PATENT DOCUMENTS

2009/0225727 A1  9/2009 Chen
2009/0304107 A1  12/2009 Aoki et al.
(Continued)

FOREIGN PATENT DOCUMENTS

CN  101321149 A  12/2008
CN  101527664 A   9/2009
(Continued)

OTHER PUBLICATIONS

Lee et al., "PAPR reduction of Legacy portion of VHT PLCP Preamble," IEEE 802.11-10/0795r2, XP017676638, pp. 1-32, Institute of Electrical and Electronics Engineers, New York, New York (Jul. 2010).
(Continued)

*Primary Examiner* — Hassan A Phillips
*Assistant Examiner* — Mohammed S Chowdhury
(74) *Attorney, Agent, or Firm* — Leydig, Voit & Mayer, Ltd.

(57) ABSTRACT

The disclosure discloses a high-efficiency short training field sequence generation method, a signal sending method, a signal receiving method, and related apparatuses, where the high-efficiency short training sequence generation method includes: increasing frequency domain density of a frequency domain sequence corresponding to a first high-efficiency short training field sequence to generate a frequency domain sequence with increased frequency domain density; generating a second high-efficiency short training field sequence according to the frequency domain sequence with increased frequency domain density; and using the second high-efficiency short training field sequence as a high-efficiency short training field sequence in a preamble sequence of a data transmission frame in a wireless local area network WLAN. In embodiments of the disclosure, a cycle of a high-efficiency short training field sequence used for performing stage-2 AGC adjustment in the WLAN may be increased, and a maximum CSD value that can be used is further increased.

16 Claims, 14 Drawing Sheets

(51) Int. Cl.
| | |
|---|---|
| *H04L 12/26* | (2006.01) |
| *H04W 80/06* | (2009.01) |
| *H04W 84/04* | (2009.01) |
| *H04W 84/12* | (2009.01) |
| *H04W 88/06* | (2009.01) |
| *H04W 4/44* | (2018.01) |
| *H04W 4/90* | (2018.01) |
| *H04W 48/18* | (2009.01) |
| *H04L 29/08* | (2006.01) |
| *H04W 52/02* | (2009.01) |
| *H04L 5/00* | (2006.01) |
| *H04L 27/26* | (2006.01) |

(52) U.S. Cl.
CPC ......... *H04L 27/2613* (2013.01); *H04W 84/12* (2013.01); *Y02D 70/142* (2018.01); *Y02D 70/144* (2018.01); *Y02D 70/146* (2018.01)

(58) Field of Classification Search
CPC ... Y02D 70/146; Y02D 70/144; Y02D 70/142
USPC ........................................................ 370/311
See application file for complete search history.

(56) References Cited

U.S. PATENT DOCUMENTS

| | | | |
|---|---|---|---|
| 2012/0051454 A1* | 3/2012 | Zheng .................. | H04L 5/0048 375/295 |
| 2012/0320890 A1 | 12/2012 | Zhang et al. | |
| 2013/0128807 A1 | 5/2013 | Vermani et al. | |
| 2014/0023092 A1 | 1/2014 | Zhang et al. | |
| 2014/0269994 A1 | 9/2014 | HomChaudhuri et al. | |
| 2015/0023335 A1* | 1/2015 | Vermani .............. | H04B 7/0452 370/338 |
| 2015/0195790 A1* | 7/2015 | Rong .................. | H04W 52/243 370/311 |

FOREIGN PATENT DOCUMENTS

| | | |
|---|---|---|
| CN | 102468952 A | 5/2012 |
| JP | 2005210690 A | 8/2005 |
| JP | 2013535876 A | 9/2013 |
| KR | 20140018390 A | 2/2014 |
| KR | 20140039051 A | 3/2014 |

OTHER PUBLICATIONS

"IEEE Standard for Information technology—Telecommunications and information exchange between systems Local and metropolitan area networks—Specific requirements; Part 11: Wireless LAN Medium Access Control (MAC) and Physical Layer (PHY) specifications," IEEE Computer Society, IEEE std 802.11-2012, Institute of Electrical and Electronics Engineers, New York, New York (Mar. 29, 2012).

"IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz," IEEE Computer Society, IEEE Computer Society, IEEE std 802.11ac-2013, Institute of Electrical and Electronics Engineers, New York, New York (2013).

"IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n-2009, Institute of Electrical and Electronics Engineers, New York, New York (Oct. 29, 2009).

"Draft Standard for Information Technology—Telecommunications and information exchange between systems—Local and metropolitan area networks—specific requirement; Part 11: Wireless LAN Medium Access Control (MAC) and Physical Layer (PHY) specifications, Amendment 5: Enhancements for Higher Throughput," IEEE P802.11n/D9.0, Institute of Electrical and Electronics Engineers, New York, New York (Mar. 2009).

* cited by examiner

| Number of a transmit link | CSD value of transmit link 1 | CSD value of transmit link 2 | CSD value of transmit link 3 | CSD value of transmit link 4 |
|---|---|---|---|---|
| 1 | 0 | — | — | — |
| 2 | 0 | −200 | — | — |
| 3 | 0 | −100 | −200 | — |
| 4 | 0 | −50 | −100 | −150 |

FIG. 2

| Quantity of spatial flows | CSD value of spatial flow 1 | CSD value of spatial flow 2 | CSD value of spatial flow 3 | CSD value of spatial flow 4 |
|---|---|---|---|---|
| 1 | 0 | — | — | — |
| 2 | 0 | −400 | — | — |
| 3 | 0 | −400 | −200 | — |
| 4 | 0 | −400 | −200 | −600 |

FIG. 3

| Total quantity of transmit antennas | CSD value (unit: ns) of a transmit antenna | | | | | | | | |
|---|---|---|---|---|---|---|---|---|---|
| | 1 | 2 | 3 | 4 | 5 | 6 | 7 | 8 | >8 |
| 1 | 0 | — | — | — | — | — | — | — | — |
| 2 | 0 | −200 | — | — | — | — | — | — | — |
| 3 | 0 | −100 | −200 | — | — | — | — | — | — |
| 4 | 0 | −50 | −100 | −150 | — | — | — | — | — |
| 5 | 0 | −175 | −25 | −50 | −75 | — | — | — | — |
| 6 | 0 | −200 | −25 | −150 | −175 | −125 | — | — | — |
| 7 | 0 | −200 | −150 | −25 | −175 | −75 | −50 | — | — |
| 8 | 0 | −175 | −150 | −125 | −25 | −100 | −50 | −200 | — |
| >8 | 0 | −175 | −150 | −125 | −25 | −100 | −50 | −200 | Between −200 and 0 inclusive |

FIG. 4

| Total quantity of transmit antennas | CSD value (unit: ns) of a transmit antenna | | | | | | | |
|---|---|---|---|---|---|---|---|---|
| | 1 | 2 | 3 | 4 | 5 | 6 | 7 | 8 |
| 1 | 0 | — | — | — | — | — | — | — |
| 2 | 0 | −400 | — | — | — | — | — | — |
| 3 | 0 | −400 | −200 | — | — | — | — | — |
| 4 | 0 | −400 | −200 | −600 | — | — | — | — |
| 5 | 0 | −400 | −200 | −600 | −350 | — | — | — |
| 6 | 0 | −400 | −200 | −600 | −350 | −650 | — | — |
| 7 | 0 | −400 | −200 | −600 | −350 | −650 | −100 | — |
| 8 | 0 | −400 | −200 | −600 | −350 | −650 | −100 | −750 |

FIG. 5

Receive a preamble sequence corresponding to a current bandwidth, where the preamble sequence includes a high-efficiency short training field sequence, the high-efficiency short training field sequence is corresponding to a segment of sequence in a high-efficiency training field sequence in a preamble sequence corresponding to a reference bandwidth, a sampling rate of the segment of sequence is a sampling rate corresponding to the current bandwidth, and the reference bandwidth is greater than the current bandwidth ⟵ S150

FIG. 15

SIGNAL SENDING METHOD, SIGNAL RECEIVING METHOD, AND APPARATUSES

CROSS-REFERENCE TO RELATED APPLICATIONS

This application is a continuation of International Application No. PCT/CN2014/087687, filed on Sep. 28, 2014, the disclosure of which is hereby incorporated by reference in its entirety.

TECHNICAL FIELD

The disclosure relates to the communications field, and in particular, to a signal sending method and apparatus, and a signal receiving method and apparatus.

BACKGROUND

A critical problem that needs to be resolved in modern wireless communication is: how to further improve spectrum utilization and transmission reliability of a system. Multiple-input multiple-output (MIMO) is a mainstream technology in current wireless communication, and is adopted into many standards such as 802.11, 802.16, and 802.15. In a MIMO technology, multiple antennas are used at both a receive end and a transmit end to form a multi-antenna system, which can effectively increase a communication capacity and improve communication quality, and can meet a requirement of large-capacity high-quality communication, effectively improve spectrum utilization, and alleviate an increasingly urgent need for spectrum resources.

The MIMO technology has already been widely adopted in existing wireless local area network (WLAN) standards. The IEEE 802.11n standard supports a maximum of 4×4 MIMO transmission (a quantity of transmit antennas and a quantity of receive antennas are both four), while the IEEE 802.11ac standard supports a maximum of 8×8 MIMO transmission (a quantity of transmit antennas and a quantity of receive antennas are both eight). In addition, a data transmission frame in WLAN is divided into two parts: a preamble (Preamble) part and a data part. When receiving a signal, a receiver in a WLAN system first needs to adjust a power gain of the received signal, so that the signal enters an analog-to-digital converter (ADC) with appropriate power to be converted into a digital signal, and digital processing is further performed on the received signal. For adjusting power of the received signal, in an existing WLAN standard, two stages of automatic gain control (AGC) adjustment are performed on the received signal by respectively using a legacy short training field (L-STF) sequence, and a high-throughput short training field (HT-STF) sequence or a very-high-throughput short training field (VHT-STF) sequence (in the prior art, the HT-STF and the VHT-STF are collectively referred to as high-efficiency short training fields) in a preamble sequence. For details, refer to FIG. 1.

FIG. 1 is a schematic diagram of a data frame structure and AGC adjustment by a receiver in an existing WLAN standard. As shown in the figure, the receiver performs stage-1 (preliminary) AGC adjustment by using an L-STF sequence in a preamble sequence, and in the preliminary AGC adjustment, a received signal may be roughly adjusted to a dynamic range of an ADC. In addition, the receiver performs stage-2 (accurate) AGC adjustment by using a VHT-STF sequence in the preamble sequence (FIG. 1 shows a case in the 802.11ac standard, and in 802.11n, stage-2 (accurate) AGC adjustment is performed by using an HT-STF sequence), and in the accurate AGC adjustment, the received signal may be accurately adjusted to the dynamic range of the ADC.

If AGC adjustment is performed on a received signal in the foregoing manner, it is necessary to make power of an STF sequence part of the received signal match power of a data part of the signal as much as possible. If in the received signal, the power of the STF sequence is greater than the power of the data part, an entire power gain of the received signal will be set to be excessively high, and consequently, saturation or peak clipping of the data part of the signal is caused. If the power of the STF sequence in the received signal is less than the power of the data part, an entire power gain of the received signal will be set to be excessively small, and consequently, sampling precision of the data part of the signal is insufficient in the ADC. To prevent the two cases mentioned above from occurring and impacting entire receiving performance of a system, it is necessary to make the power of the STF sequence match the power of the data part.

When there are multiple transmit antennas at the transmit end of the system, transmit antennas send same STF sequences in the preamble sequence, and for the data part, mutually independent data streams may be sent. In this case, amplitude superposition occurs in the STF sequence, and consequently, the power of the STF sequence is severely deviated from the power of the data part. To avoid such a beamforming effect, a cyclic shift delay is introduced into the WLAN system. A larger CSD value indicates that the receiver may obtain better AGC adjustment performance. In addition, when a quantity of transmit antennas is larger, the system needs a larger CSD value to obtain better AGC performance.

Currently, applying a CSD value greater than 200 ns to an L-STF sequence affects a cross correlation of sequences, and consequently affects correct reception of an L-SIG sequence. Therefore, in the existing WLAN standards, for an L-STF/L-LTF/L-SIG part, a maximum CSD value of a preamble sequence is limited to be not greater than 200 ns.

In the prior art, a solution used in the IEEE 802.11n standard is that a CSD sequence of a maximum of 200 ns is used for a legacy part L-LTF sequence of a preamble sequence, where the IEEE 802.11n standard supports a maximum of four transmit antennas. CSD sequences used for different quantities of transmit antennas are shown in FIG. 2.

In addition, in the solution used in the IEEE 802.11n standard, an L-STF sequence is reused for an HT-STF. Differently, an OFDM symbol whose duration is 4 μs is used in the HT-STF part. CSD sequences used for the HT-STF part are shown in FIG. 3.

It may be learned from FIG. 3 that, to obtain better AGC performance, a maximum CSD value used for the HT-STF sequence in the IEEE 802.11n standard is increased to 600 ns.

A CSD value of the HT-STF in the prior art is increased correspondingly. However, a limitation of the solution is: the L-STF sequence is reused for the HT-STF sequence in the system, and in this way, there are five cycles in 4 μs of the HT-STF sequence, where duration of each cycle is 800 ns. In this way, applying a CSD of 800 ns to the sequence is equivalent to applying a CSD of 0 ns to the sequence because cycles in this time sequence coincide with each other. Therefore, in the prior art, a maximum CSD value possibly used for the sequence can be limited to be only 750 ns (a sampling interval of time domain signals in a bandwidth of 20 M is 50 ns).

Similar to the IEEE 802.11n standard, a solution used in the IEEE 802.11ac standard is that a CSD sequence of a maximum of 200 ns is used for a legacy part L-STF sequence in a preamble sequence; however, a maximum quantity of supported transmit antennas is increased to 8. For the legacy part L-STF in the preamble sequence, CSD sequences used for different quantities of transmit antennas are shown in FIG. 4.

Similar to the 11n, in the 11ac standard, an L-STF sequence is also reused for a VHT-STF, and an OFDM symbol whose duration is 4 μs is used in a VHT-STF part in the 11ac standard. CSD sequences used for the VHT-STF part are shown in FIG. 5.

It may be learned from FIG. 5 that, to obtain better AGC performance, a maximum CSD value for a VHT part of a preamble sequence and a data part is increased to a limit value: 750 ns.

Similar to the IEEE 802.11n standard, a limitation of the current solution in the IEEE 802.11ac standard is: the L-STF sequence is reused for the VHT-STF sequence in the system, and in this way, there are five cycles in 4 μs of the VHT-STF sequence, where duration of each cycle is 800 ns. Therefore, a maximum CSD value possibly used for the sequence also can be limited to only 750 ns (a sampling interval of time domain signals in a bandwidth of 20 M is 50 ns).

In conclusion, in the prior art, a cycle of a high-efficiency short training field sequence in a preamble sequence in a WLAN system is short, and consequently, a maximum CSD value that can be used is extremely limited. Eventually, AGC adjustment performance may be unsatisfactory.

SUMMARY

In view of this, the disclosure provides a high-efficiency short training field sequence generation method and apparatus, a signal sending method and apparatus, and a signal receiving method and apparatus, so that a cycle of a high-efficiency short training sequence in a preamble sequence of a data transmission frame in a WLAN can be increased, and further, a maximum CSD value that can be applied to the high-efficiency short training field sequence can be increased.

One aspect of the disclosure, a signal sending method, applied to a wireless local area network and comprising: generating a preamble sequence corresponding to a current bandwidth, wherein the preamble sequence comprises a high-efficiency short training field sequence, the high-efficiency short training field sequence is corresponding to a segment of sequence in a high-efficiency training field sequence in a preamble sequence corresponding to a reference bandwidth, and wherein the segment of sequence comprises at least one cycle, the length of the cycles is respectively 1600 ns; sending the generated preamble sequence.

Another aspect of the disclosure, a signal receiving method, applied to a wireless local area network and comprising: receiving a preamble sequence corresponding to a current bandwidth, wherein the preamble sequence comprises a high-efficiency short training field sequence, the high-efficiency short training field sequence is corresponding to a segment of sequence in a high-efficiency training field sequence in a preamble sequence corresponding to a reference bandwidth, and the reference bandwidth is greater than the current bandwidth; wherein the segment of sequence comprises at least one cycle, the length of the cycles is respectively 1600 ns; based on the received high-efficiency short training field sequence, processing signals.

Other aspects of the disclosure has disclosed an apparatus or device which can execute the above method.

It may be learned from the foregoing description that, in some feasible implementation manners of the disclosure, frequency domain density of a frequency domain sequence corresponding to a first high-efficiency short training field sequence is increased to generate a frequency domain sequence with increased frequency domain density; a second high-efficiency short training field sequence is generated according to the frequency domain sequence with increased frequency domain density; and the second high-efficiency short training field sequence is used as a high-efficiency short training field sequence (for example, an HT-STF sequence in IEEE 802.11n, or a VHT-STF sequence in IEEE 802.11ac, or an HE-STF (High-Efficiency-Short Training Field, high-efficiency short training field) in a next-generation WLAN network) in a preamble sequence of a data transmission frame in a wireless local area network WLAN. Therefore, a cycle of the high-efficiency short training sequence in the preamble sequence of the data transmission frame in the WLAN in an embodiment of the disclosure is increased in comparison with a cycle of the existing HT-STF sequence in IEEE 802.11n or a cycle of the existing VHT-STF sequence in IEEE 802.11ac in the prior art, and further, a maximum cyclic shift delay CSD value that can be used in the WLAN increases accordingly. Further, better AGC performance can be obtained when two stages of automatic gain control AGC adjustment are performed on a received signal in a WLAN system by respectively using an L-STF sequence and a cycle-increased HT-STF sequence or VHT-STF sequence or HE-STF sequence in the preamble sequence.

It may be learned from the foregoing description that, in some feasible implementation manners of the disclosure, a first high-efficiency short training field sequence in a preamble sequence corresponding to a second bandwidth is obtained, where the second bandwidth is greater than a first bandwidth; a segment of sequence is captured from the obtained first high-efficiency short training field sequence, where a quantity of sampling points included in the segment of sequence is a quantity of sampling points corresponding to a high-efficiency short training field sequence in a preamble sequence corresponding to the first bandwidth; a sampling rate of the captured segment of sequence is changed to a sampling rate corresponding to the first bandwidth, to obtain a second high-efficiency short training field sequence; and the second high-efficiency short training field sequence is used as the high-efficiency short training field sequence (for example, an HT-STF sequence in IEEE 802.11n, or a VHT-STF sequence in IEEE 802.11ac, or an HE-STF in a next-generation WLAN network) in the preamble sequence corresponding to the first bandwidth. Therefore, a cycle of the high-efficiency short training field sequence in the preamble sequence corresponding to the first bandwidth is increased, and further, a maximum cyclic shift delay CSD value that can be used in the first bandwidth increases accordingly. Further, better AGC performance can be obtained when two stages of automatic gain control AGC adjustment are performed on a received signal in a WLAN system in the first bandwidth by respectively using an L-STF sequence and a cycle-increased HT-STF sequence or VHT-STF sequence or HE-STF sequence in the preamble sequence.

It may be learned from the foregoing description that, in some feasible implementation manners of the disclosure, a preamble sequence is generated, where the preamble sequence includes a high-efficiency short training field sequence (for example, an HT-STF sequence in IEEE 802.11n, or a VHT-STF sequence in IEEE 802.11ac, or an HE-STF in a next-generation WLAN network), and a quantity of zero values between neighboring non-zero values in a frequency domain sequence corresponding to the high-efficiency short training field sequence is less than 3; and the generated preamble sequence is sent. Therefore, a cycle of a high-efficiency short training sequence in a preamble sequence of a data transmission frame in a WLAN in an embodiment of the disclosure is increased relative to a cycle of the existing HT-STF sequence in IEEE 802.11n or a cycle of the existing VHT-STF sequence in IEEE 802.11ac in the prior art, and further, a maximum cyclic shift delay CSD value that can be used in the WLAN increases accordingly. Further, better AGC performance can be obtained when two stages of automatic gain control AGC adjustment are performed on a received signal in a WLAN system by respectively using an L-STF sequence and a cycle-increased HT-STF sequence or VHT-STF sequence or HE-STF sequence in the preamble sequence.

It may be learned from the foregoing description that, in some feasible implementation manners of the disclosure, a preamble sequence is received, where the preamble sequence includes a high-efficiency short training field sequence (for example, an HT-STF sequence in IEEE 802.11n, or a VHT-STF sequence in IEEE 802.11ac, or an HE-STF in a next-generation WLAN network), and a quantity of zero values between neighboring non-zero values in a frequency domain sequence corresponding to the high-efficiency short training field sequence is less than 3. A cycle of a high-efficiency short training sequence in a preamble sequence of a data transmission frame in a WLAN in an embodiment of the disclosure is increased relative to a cycle of the existing HT-STF sequence in IEEE 802.11n or a cycle of the existing VHT-STF sequence in IEEE 802.11ac in the prior art, and further, a maximum cyclic shift delay CSD value that can be used in the WLAN increases accordingly. Further, better AGC performance can be obtained when two stages of automatic gain control AGC adjustment are performed on a received signal in a WLAN system by respectively using an L-STF sequence and a cycle-increased HT-STF sequence or VHT-STF sequence or HE-STF sequence in the preamble sequence.

It may be learned from the foregoing description that, in some feasible implementation manners of the disclosure, a preamble sequence corresponding to a current bandwidth is generated, where the preamble sequence includes a high-efficiency short training field sequence (for example, an HT-STF sequence in IEEE 802.11n, or a VHT-STF sequence in IEEE 802.11ac, or an HE-STF in a next-generation WLAN network), the high-efficiency short training field sequence is corresponding to a segment of sequence in a high-efficiency training field sequence in a preamble sequence corresponding to a reference bandwidth, a sampling rate of the segment of sequence is a sampling rate corresponding to the current bandwidth, and the reference bandwidth is greater than the current bandwidth; and the generated preamble sequence is sent. Therefore, a cycle of a high-efficiency short training field sequence in the preamble sequence corresponding to the current bandwidth is increased relative to a cycle of the existing HT-STF sequence in IEEE 802.11n or a cycle of the existing VHT-STF sequence in IEEE 802.11ac in the prior art, and further, a maximum cyclic shift delay CSD value that can be used in a WLAN system in the current bandwidth increases accordingly. Further, better AGC performance can be obtained when two stages of automatic gain control AGC adjustment are performed on a received signal in the WLAN system in the current bandwidth by respectively using an L-STF sequence and a cycle-increased HT-STF sequence or VHT-STF sequence or HE-STF sequence in the preamble sequence.

It may be learned from the foregoing description that, in some feasible implementation manners of the disclosure, a preamble sequence corresponding to a current bandwidth is received, where the preamble sequence includes a high-efficiency short training field sequence (for example, an HT-STF sequence in IEEE 802.11n, or a VHT-STF sequence in IEEE 802.11ac, or an HE-STF in a next-generation WLAN network), the high-efficiency short training field sequence is corresponding to a segment of sequence in a high-efficiency training field sequence in a preamble sequence corresponding to a reference bandwidth, a sampling rate of the segment of sequence is a sampling rate corresponding to the current bandwidth, and the reference bandwidth is greater than the current bandwidth. Therefore, a cycle of a high-efficiency short training field sequence in the preamble sequence corresponding to the current bandwidth is increased relative to a cycle of the existing HT-STF sequence in IEEE 802.11n or a cycle of the existing VHT-STF sequence in IEEE 802.11ac in the prior art, and further, a maximum cyclic shift delay CSD value that can be used in a WLAN system in the current bandwidth increases accordingly. Further, better AGC performance can be obtained when two stages of automatic gain control AGC adjustment are performed on a received signal in the WLAN system in the current bandwidth by respectively using an L-STF sequence and a cycle-increased HT-STF sequence or VHT-STF sequence or HE-STF sequence in the preamble sequence.

BRIEF DESCRIPTION OF DRAWINGS

FIG. 2 is a list of CSD sequences used for a legacy part L-LTF of a preamble sequence in the IEEE 802.11n standard in the prior art;

FIG. 3 is a list of CSD sequences used for an HT-STF in a preamble sequence in the IEEE 802.11n standard in the prior art;

FIG. 4 is a list of CSD sequences used for a legacy part L-LTF of a preamble sequence in the IEEE 802.11ac standard in the prior art;

FIG. 5 is a list of CSD sequences used for a VHT in a preamble sequence in the IEEE 802.11ac standard in the prior art;

FIG. 15 is a schematic flowchart of another embodiment of a signal receiving method according to the disclosure;

DESCRIPTION OF EMBODIMENTS

The following describes the technical solutions of the disclosure in detail by using examples with reference to the accompanying drawings and specific embodiment methods.

Embodiments of the disclosure disclose a high-efficiency short training field sequence generation method and apparatus, and the method and the apparatus are applied to a wireless local area network.

Figure 1:
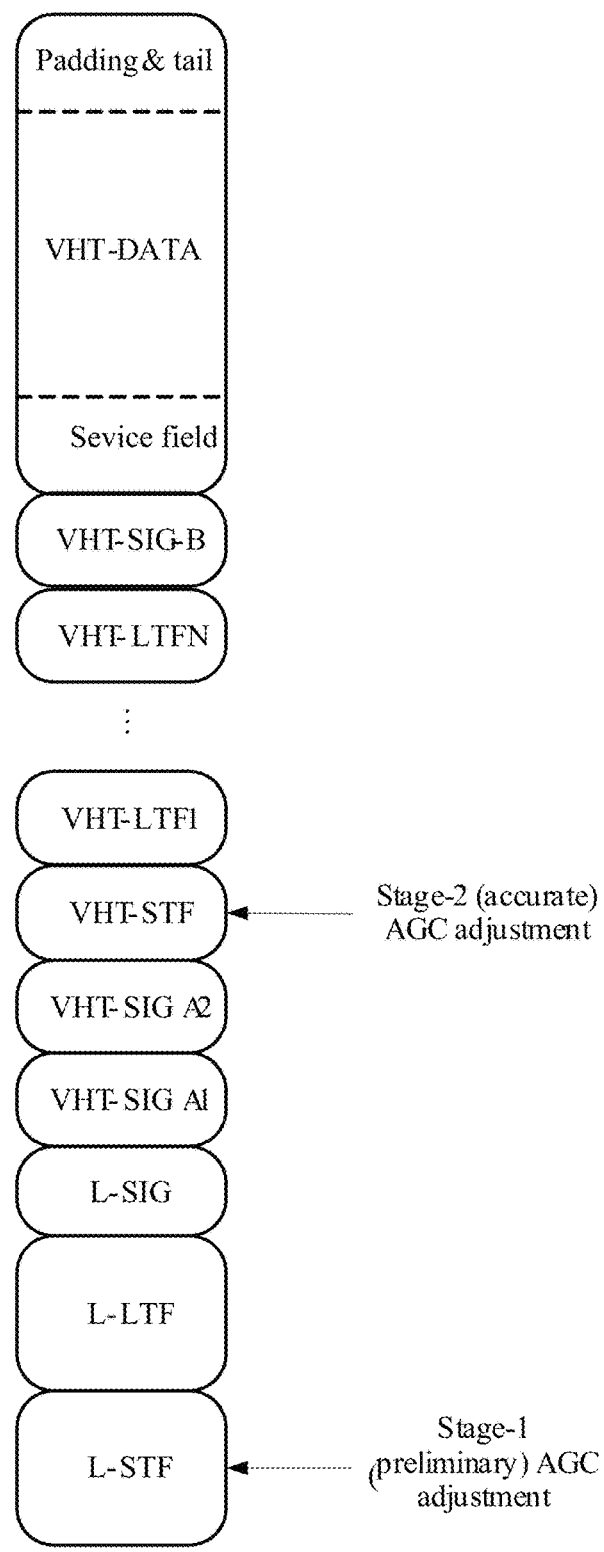
FIG. 1 is a schematic diagram of a data frame structure and AGC adjustment performed by a receiver in an existing WLAN standard.
Figure 6:
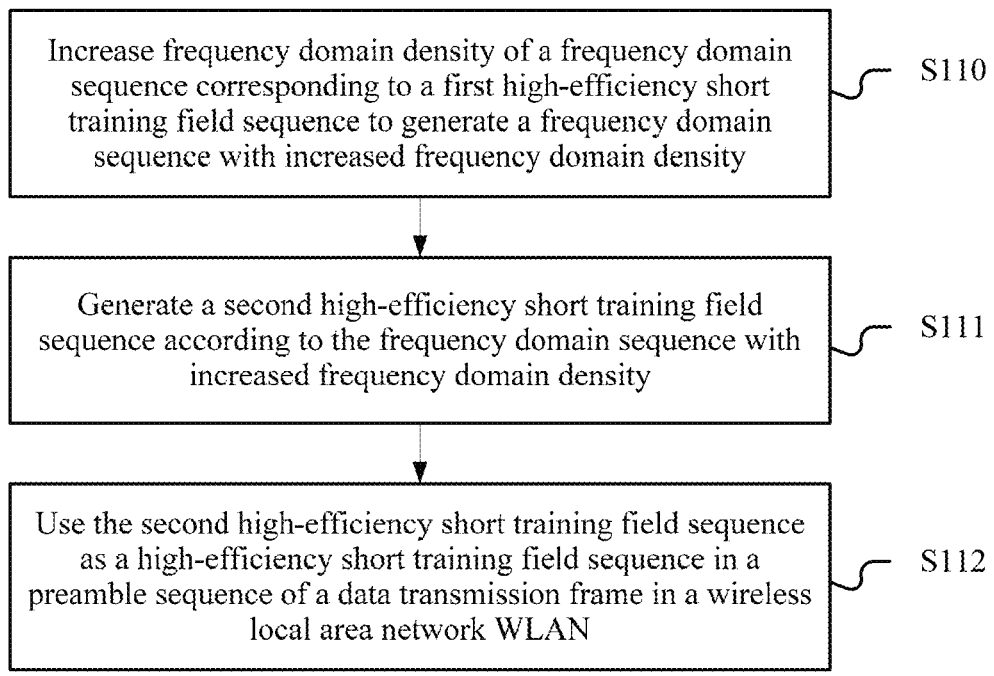
FIG. 6 is a schematic flowchart of an embodiment of a short training field generation method according to the disclosure.

FIG. 6 is a schematic diagram of procedure composition of an embodiment of a high-efficiency short training field sequence generation method according to the disclosure. As shown in FIG. 6, the method may include the following steps.

Step S110: Increase frequency domain density of a frequency domain sequence corresponding to a first high-efficiency short training field sequence to generate a frequency domain sequence with increased frequency domain density.

In specific implementation, the first high-efficiency training field sequence in this embodiment of the disclosure may be an HT-STF in the IEEE 802.11n standard or a VHT-STF in the IEEE 802.11ac standard in a WLAN system in the prior art, where duration of a time domain sequence of the HT-STF in IEEE 802.11n is 4 μs (including a cyclic prefix CP), five cycles are included in the 4 μs, and a length of each cycle is 800 ns; duration of a time domain sequence of the VHT-STF in IEEE 802.11ac is also 4 μs, five cycles are also included in the 4 μs, and a length of each cycle is 800 ns. Generally, in a bandwidth of 20 M, a frequency domain sequence corresponding to the HT-STF or the VHT-STF in WLAN in the prior art is as follows:

Sequence 1:
[0, 0, 0, 0, 0, 0, 0, 0, 1+1i, 0, 0, 0, −1−1i, 0, 0, 0, 1+1i, 0, 0, 0, −1−1i, 0, 0, 0, −1−1i, 0, 0, 0, 1+1i, 0, 0, 0, . . . , 0, 0, 0, −1−1i, 0, 0, 0, −1−1i, 0, 0, 0, +1i, 0, 0, 0, 1+1i, 0, 0, 0, 1+1i, 0, 0, 0, 1+1i, 0, 0, 0, 0, 0, 0, 0]

It may be learned from the sequence 1 that there are three 0s between values in the frequency domain sequence of the HT-STF or the VHT-STF in the original bandwidth of 20 M.

In specific implementation, the frequency domain sequence corresponding to the first high-efficiency short training field sequence in this embodiment of the disclosure may be a frequency domain sequence obtained after frequency domain density of the frequency domain sequence corresponding to the VHT-STF or the HT-STF in the WLAN system in the prior art is increased once or multiple times by using the method in the disclosure. Specifically, in step S110, a quantity of 0s between non-zero values in the frequency domain sequence corresponding to the first high-efficiency short training field sequence may be reduced, so as to increase the frequency domain density. For example, three 0s between values in the sequence 1 may be reduced to two 0s or one 0. For a specific sequence obtained after frequency domain density of the sequence 1 is increased, refer to a sequence 2 and a sequence 3.

Sequence 2:
[0, 0, 0, 0, 0, 0, 0, 0, 1+1i, 0, 0, −1−1i, 0, 0, −1−1i, 0, 0, −1−1i, 0, 0, 1+1i, 0, 0, . . . , 0, 0, −1−1i, 0, 0, −1−1i, 0, 0, −1−1i, 0, 0, 1+1i, 0, 0, 1+1i, 0, 0, 1+1i, 0, 0, 0, 0, 0, 0, 0]

Sequence 3:
[0, 0, 0, 0, 0, 0, 0, 0, 1+1i, 0, −1−1i, 0, −1−1i, 0, −1−1i, 0, 1+1i, 0, . . . , 0, −1−1i, 0, −1−1i, 0, −1−1i, 0, 1+1i, 0, 1+1i, 0, 1+1i, 0, 0, 0, 0, 0, 0, 0]

It may be learned from the sequence 2 and the sequence 3 that, in the bandwidth of 20 M, when three 0s between values in the frequency domain sequence of the HT-STF or the VHT-STF are changed to two 0s or one 0, cycle lengths of corresponding time domain sequences are increased by 4/3 times and 2 times respectively, 3.75 cycles and 2.5 cycles may be respectively included in duration of 4 μs, and lengths of the cycles are respectively 3200/3 ns and 1600 ns.

In specific implementation, alternatively, the frequency domain sequence of the first high-efficiency short training field in this embodiment of the disclosure may be a frequency domain sequence formed by transforming a segment of time domain sequence captured from a time domain sequence of a VHT-STF or an HT-STF in a large bandwidth. For example, in a bandwidth of 40 MHz, 2.5 cycles (including 80 sampling points) are captured from a time domain sequence of 4 μs of a VHT-STF or an HT-STF, and the 80 sampling points in the captured 2.5 cycles are then transformed according to a sampling rate at 20 MHz, so that a segment of time domain sequence whose time domain cycle is lengthened in 20 MHz may be obtained. Then, the time domain sequence whose time domain cycle is lengthened in 20 MHz is transformed into a frequency domain sequence according to a transformation relationship between a time domain sequence and a frequency domain sequence. In specific implementation, in the bandwidth of 40 MHz, the time domain sequence of 4 µs of the VHT-STF or the HT-STF includes five cycles, and includes 160 sampling points, where each cycle is 800 ns. After 80 sampling points in 2.5 cycles are captured, and are transformed according to the sampling rate at 20 MHz, an obtained time domain sequence includes 2.5 cycles in the 4 µs, and each cycle is changed to 1600 ns. The time sequence is transformed into a frequency domain sequence, and a time domain sequence is formed after frequency domain density is increased, and includes less than 2.5 cycles in 4 µs. Duration of each cycle is greater than 1600 ns.

In specific implementation, a WLAN standard supports multiple types of bandwidth configurations such as 20 MHz, 40 MHz, 80 MHz, and 160 MHz, where 20 MHz is a minimum bandwidth. In the existing WLAN standard, a frequency domain sequence (for example, the foregoing sequence 1) of a short training field STF is defined in a bandwidth of 20 MHz, and a frequency domain sequence of an STF in a larger bandwidth is obtained by repeating the STF sequence in a frequency domain, and by adding phase rotation. For example, an STF frequency domain in the bandwidth of 20 MHz is [L-STF], and an STF frequency domain in the bandwidth of 40 MHz is [1*L-STF, j*L-LTF].

In specific implementation, a method used for increasing the frequency domain density of the frequency domain sequence of the first high-efficiency short training field in step S110 in this embodiment of the disclosure is reducing a quantity of 0s between non-zero values in the frequency domain sequence. As exemplified above, both the sequence 2 and the sequence 3 are frequency domain sequences generated after the frequency density of the sequence 1 is increased. Alternatively, in this embodiment of the disclosure, a quantity of 0s between non-zero values in the frequency domain sequence obtained by transforming the time domain sequence whose time domain cycle is lengthened in 20 MHz may be increased, so as to obtain a frequency domain sequence 4 with increased frequency domain density.

Step S111: Generate a second high-efficiency short training field sequence according to the frequency domain sequence with increased frequency domain density.

Specifically, in step S111, inverse Fourier transform may be performed on the frequency domain sequence with increased frequency domain density, and a cyclic prefix may be added, so as to obtain the second high-efficiency short training field sequence. Alternatively, in step S111, inverse Fourier transform may be performed on the frequency domain sequence with increased frequency domain density, so as to obtain the second high-efficiency short training field sequence.

Step S112: Use the second high-efficiency short training field sequence as a high-efficiency short training field sequence in a preamble sequence of a data transmission frame in a wireless local area network WLAN.

In specific implementation, in the WLAN network, a short training field sequence used for performing stage-2 AGC adjustment may be an HT-STF sequence in IEEE 802.11n, or a VHT-STF sequence in IEEE 802.11ac, or an HE-STF (High-Efficiency-Short Training Field, high-efficiency short training field) in a next-generation WLAN network, or another short training field sequence used for performing stage-2 AGC adjustment.

With reference to the foregoing examples, in this embodiment of the disclosure, time domain sequences corresponding to the sequence 2 and the sequence 3 may be used as the high-efficiency short training field sequence in the preamble sequence of the data transmission frame in the wireless local area network WLAN. Alternatively, in this embodiment of the disclosure, a time domain sequence corresponding to the frequency domain sequence 4 may be used as the high-efficiency short training field sequence in the preamble sequence of the data transmission frame in the wireless local area network WLAN.

With reference to the foregoing examples, the sequence 2 and the sequence 3 include 2.5 cycles in the duration of 4 µs, and a length of each cycle is 1600 ns. When the time domain sequences corresponding to the sequence 2 and the sequence 3 are used as the high-efficiency short training field sequence (for example, the HT-STF sequence in IEEE 802.11n, or the VHT-STF sequence in IEEE 802.11ac, or the HE-STF in the next-generation WLAN network) in the preamble sequence of the data transmission frame in the wireless local area network WLAN, a maximum cyclic shift delay CSD value that can be used in the WLAN increases accordingly (when the sequence 3 is used, a CSD value is changed from 750 ns in the prior art to 1550 ns). Further, better AGC performance can be obtained when two stages of automatic gain control AGC adjustment are performed on a received signal in a WLAN system by respectively using an L-STF in the preamble sequence and a cycle-increased short training field sequence that is used for performing stage-2 AGC adjustment in the second high-efficiency short training field in this embodiment of the disclosure. With reference to the foregoing examples, the time domain sequence corresponding to the frequency domain sequence 4 includes less than 2.5 cycles in 4 µs, and duration of each cycle is greater than 1600 ns. In this way, when a time domain sequence whose cycle duration is greater than 1600 ns is used as the high-efficiency short training field sequence (for example, the HT-STF sequence in IEEE 802.11n, or the VHT-STF sequence in IEEE 802.11ac, or the HE-STF in the next-generation WLAN network) in the preamble sequence of the data transmission frame in the wireless local area network WLAN, a maximum cyclic shift delay CSD value that can be used in the WLAN increases accordingly (changed from 750 ns in the prior art to be greater than 1550 ns). Further, better AGC performance can be obtained when two stages of automatic gain control AGC adjustment are performed on a received signal in a WLAN system by respectively using an L-STF in the preamble sequence and a cycle-increased short training field sequence that is used for performing stage-2 AGC adjustment in the second high-efficiency short training field in this embodiment of the disclosure.

In specific implementation, both the first high-efficiency short training field sequence and the second high-efficiency short training field sequence enumerated above in this embodiment of the disclosure are sequences to which cyclic prefixes CPs are added. In specific implementation, when no cyclic prefix CP is added, in each bandwidth, duration of the first high-efficiency short training field sequence and duration of the second high-efficiency short training field sequence in this embodiment of the disclosure may be 3.2 µs or another value. When the duration of the first high-efficiency short training field sequence and the duration of the second high-efficiency short training field sequence are 3.2 µs, four cycles are included, and duration of each cycle is 800 ns.

It may be learned from the foregoing description that, in some feasible implementation manners of the disclosure, frequency domain density of a frequency domain sequence corresponding to a first high-efficiency short training field sequence is increased to generate a frequency domain sequence with increased frequency domain density; a second high-efficiency short training field sequence is generated according to the frequency domain sequence with increased frequency domain density; and the second high-efficiency short training field sequence is used as a high-efficiency short training field sequence (for example, an HT-STF sequence in IEEE 802.11n, or a VHT-STF sequence in IEEE 802.11ac, or an HE-STF (High-Efficiency-Short Training Field, high-efficiency short training field) in a next-generation WLAN network) in a preamble sequence of a data transmission frame in a wireless local area network WLAN. Therefore, a cycle of the high-efficiency short training sequence in the preamble sequence of the data transmission frame in the WLAN in this embodiment of the disclosure is increased relative to a cycle of the existing HT-STF sequence in IEEE 802.11n or a cycle of the existing VHT-STF sequence in IEEE 802.11ac in the prior art, and further, a maximum cyclic shift delay CSD value that can be used in the WLAN increases accordingly. Further, better AGC performance can be obtained when two stages of automatic gain control AGC adjustment are performed on a received signal in a WLAN system by respectively using an L-STF sequence and a cycle-increased HT-STF sequence or VHT-STF sequence or HE-STF sequence in the preamble sequence.

Figure 7:
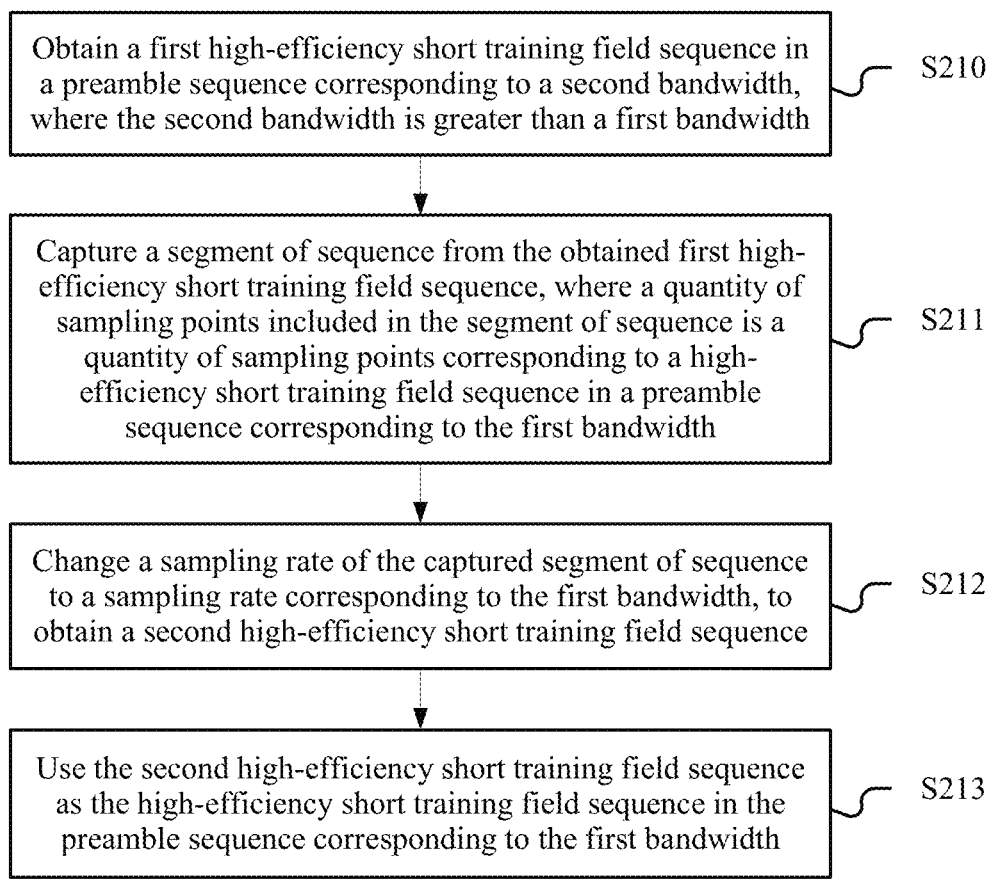
FIG. 7 is a schematic flowchart of another embodiment of a short training field generation method according to the disclosure.

FIG. 7 is a schematic diagram of procedure composition of another embodiment of a short training field generation method according to the disclosure. As shown in FIG. 7, the method may include the following steps.

Step S210: Obtain a first high-efficiency short training field sequence in a preamble sequence corresponding to a second bandwidth, where the second bandwidth is greater than a first bandwidth.

In specific implementation, a WLAN standard supports multiple types of bandwidth configurations such as 20 MHz, 40 MHz, 80 MHz, and 160 MHz, where 20 MHz is a minimum bandwidth. In the existing WLAN standard, a frequency domain sequence (for example, the foregoing sequence 1) of a short training field STF is defined in a bandwidth of 20 MHz, and a frequency domain sequence of an STF in a larger bandwidth is obtained by repeating the STF sequence in a frequency domain, and by adding phase rotation. For example, an STF frequency domain in the bandwidth of 20 MHz is [L-STF], and an STF frequency domain in a bandwidth of 40 MHz is [1*L-STF, j*L-LTF]. In various bandwidths, duration of a time domain sequence of an HT-STF or a VHT-STF is 4 µs. Differently, a larger bandwidth indicates denser sampling points used by the time domain sequence. In this way, a larger bandwidth indicates a longer STF time domain sequence corresponding to the HT-STF or the VHT-STF. For the WLAN standard, the first bandwidth may be any one of 20 MHz, 40 MHz, or 80 MHz, provided that the second bandwidth is greater than the first bandwidth. For example, when the first bandwidth is 20 MHz, the second bandwidth may be any one of 40 MHz, 80 MHz, or 160 MHz. When the first bandwidth is 40 MHz, the second bandwidth may be either 80 MHz or 160 MHz. When the first bandwidth is 80 MHz, the second bandwidth may be 160 MHz. Certainly, in specific implementation, the first bandwidth and the second bandwidth used in this embodiment of the disclosure may not be limited to the foregoing enumerated values.

In specific implementation, for the bandwidth of 20 MHz, in duration of 4 µs (including a cyclic prefix CP), a high-efficiency short training field (for example, an HT-STF sequence in IEEE 802.11n, or a VHT-STF sequence in IEEE 802.11ac, or an HE-STF (High-Efficiency-Short Training Field, high-efficiency short training field) in a next-generation WLAN network) sequence includes 80 sampling points. For the bandwidth of 40 MHz, in duration of 4 µs, a high-efficiency short training field sequence (for example, an HT-STF sequence in IEEE 802.11n, or a VHT-STF sequence in IEEE 802.11ac, or an HE-STF (High-Efficiency-Short Training Field, high-efficiency short training field) in a next-generation WLAN network) includes 160 sampling points. For the bandwidth of 80 MHz, in duration of 4 µs, a high-efficiency short training field sequence (for example, an HT-STF sequence in IEEE 802.11n, or a VHT-STF sequence in IEEE 802.11ac, or an HE-STF (High-Efficiency-Short Training Field, high-efficiency short training field) in a next-generation WLAN network) includes 320 sampling points. Duration of the bandwidth of 20 MHz, duration of the bandwidth of 40 MHz, and duration of the bandwidth of 80 MHz in a time domain are 4 µs each. Therefore, capturing may be performed on a high-efficiency short training field sequence in the bandwidth of 40 MHz or 80 MHz, and digital-to-analog conversion is then performed on a captured time domain sequence according to a sampling rate (50 ns) corresponding to the bandwidth of 20 MHz, so that a high-efficiency short training field sequence with an increased time domain cycle in 20 MHz is obtained. In specific implementation, before capturing is performed, the captured time domain sequence in this embodiment of the disclosure is formed by transforming a precoded frequency domain sequence.

In specific implementation, for the bandwidth of 20 MHz, in duration of 3.2 µs (including no cyclic prefix CP), a high-efficiency short training field sequence (for example, an HT-STF sequence in IEEE 802.11n, or a VHT-STF sequence in IEEE 802.11ac, or an HE-STF (High-Efficiency-Short Training Field, high-efficiency short training field) in a next-generation WLAN network) includes 64 sampling points. For the bandwidth of 40 MHz, in duration of 3.2 µs, a high-efficiency short training field sequence (for example, an HT-STF sequence in IEEE 802.11n, or a VHT-STF sequence in IEEE 802.11ac, or an HE-STF (High-Efficiency-Short Training Field, high-efficiency short training field) in a next-generation WLAN network) includes 128 sampling points. For the bandwidth of 80 MHz, in duration of 3.2 µs, a high-efficiency short training field sequence (for example, an HT-STF sequence in IEEE 802.11n, or a VHT-STF sequence in IEEE 802.11ac, or an HE-STF (High-Efficiency-Short Training Field, high-efficiency short training field) in a next-generation WLAN network) includes 256 sampling points. Duration of the bandwidth of 20 MHz, duration of the bandwidth of 40 MHz, and duration of the bandwidth of 80 MHz in a time domain are 3.2 µs each. Therefore, capturing may be performed on a time domain sequence of a short training field in the bandwidth of 40 MHz or 80 MHz, and digital-to-analog conversion is then performed on a captured time domain sequence according to a sampling rate (50 ns) corresponding to the bandwidth of 20 MHz, so that a time domain sequence of a short training field with an increased time domain cycle in 20 MHz is obtained.

In specific implementation, in the bandwidth of 20 MHz, a corresponding sampling rate is 50 ns; in the bandwidth of 40 MHz, a corresponding sampling rate is 25 ns; in the bandwidth of 80 MHz, a corresponding sampling rate is 12.5 ns; in the bandwidth of 160 MHz, a corresponding sampling rate is 6.25 ns.

In specific implementation, in step S210, when the first bandwidth is 20 MHz, the second bandwidth may be any one of 40 MHz, 80 MHz, or 160 MHz. The first high-efficiency short training field sequence may be a sequence including 160 sampling points in the duration of 4 µs in 40 MHz, or may be a sequence including 320 sampling points in the duration of 4 µs in the bandwidth of 80 MHz, or may be a sequence including 640 sampling points in the duration of 4 µs in the bandwidth of 160 MHz. When the first bandwidth is 40 MHz, the second bandwidth may be either 80 MHz or 160 MHz. The first high-efficiency short training field sequence may be a sequence including 320 sampling points in the duration of 4 µs in the bandwidth of 80 MHz, or may be a sequence including 640 sampling points in the duration of 4 µs in the bandwidth of 160 MHz. When the first bandwidth is 80 MHz, the second bandwidth may be 160 MHz. The first high-efficiency short training field sequence may be a sequence including 640 sampling points in the duration of 4 µs in the bandwidth of 160 MHz.

Further, in some embodiments, the first high-efficiency short training field sequence in the disclosure may include five cycles in the duration of 4 µs, and a length of each cycle is 800 ns.

Step S211: Capture a segment of sequence from the obtained first high-efficiency short training field sequence, where a quantity of sampling points included in the segment of sequence is a quantity of sampling points corresponding to a high-efficiency short training field sequence in a preamble sequence corresponding to the first bandwidth.

In specific implementation, when the segment of sequence is captured from the obtained first high-efficiency short training field sequence, the segment of sequence is captured in normal order according to a preset start position from the first high-efficiency short training field sequence in the preamble sequence corresponding to the second bandwidth. Generally, the captured segment of sequence should include at least one cycle.

For example, the first bandwidth is 20 MHz, the second bandwidth is 40 MHz, and duration of a time domain sequence is 4 µs. In this embodiment of the disclosure, 80 sampling points may be captured in normal order according to a preset start position (for example, a start position or a non-start position of a high-efficiency short training field sequence in the bandwidth of 40 MHz) from 160 sampling points in the high-efficiency short training field sequence in the bandwidth of 40 MHz (which is equivalent to capturing a time domain sequence of 2.5 cycles).

For example, the first bandwidth is 20 MHz, the second bandwidth is 80 MHz, and duration of a time domain sequence is 4 µs. In this embodiment of the disclosure, 80 sampling points may be captured in normal order according to a preset start position (for example, a start position or a non-start position of a high-efficiency short training field sequence of a short training field in the bandwidth of 80 MHz) from 320 sampling points in a time domain sequence of a short training field in the bandwidth of 80 MHz (which is equivalent to capturing a time domain sequence of 1.25 cycles).

In specific implementation, when the segment of sequence is captured from the obtained first high-efficiency short training field sequence, the segment of sequence is captured in reverse order according to a preset end position from the first high-efficiency short training field sequence in the preamble sequence corresponding to the second bandwidth.

For example, the first bandwidth is 40 MHz, the second bandwidth is 80 MHz, and duration of a time domain sequence is 4 µs. In this embodiment of the disclosure, 160 sampling points may be captured in reverse order according to a preset end position (for example, an end position or a non-end position of a high-efficiency short training field sequence in the bandwidth of 80 MHz) from 320 sampling points in the high-efficiency short training field sequence in the bandwidth of 80 MHz (which is equivalent to capturing a time domain sequence of 2.5 cycles).

For example, the first bandwidth is 20 MHz, the second bandwidth is 80 MHz, and duration of a time domain sequence is 4 µs. In this embodiment of the disclosure, 80 sampling points may be captured in reverse order according to a preset end position (for example, an end position or a non-end position of a high-efficiency short training field sequence in the bandwidth of 80 MHz) from 320 sampling points in the high-efficiency short training field sequence in the bandwidth of 80 MHz (which is equivalent to capturing a time domain sequence of 1.25 cycles).

Step S212: Change a sampling rate of the captured segment of sequence to a sampling rate corresponding to the first bandwidth, to obtain a second high-efficiency short training field sequence.

For example, the first bandwidth is 20 MHz, the second bandwidth is 40 MHz, and duration of a time domain sequence is 4 µs. Because both duration of a time domain sequence of the first bandwidth and duration of a time domain sequence of the second bandwidth are 4 µs, after a sampling rate of the 80 sampling points captured in the bandwidth of 40 MHz (which is equivalent to capturing a time domain sequence of 2.5 cycles) is changed from 25 ns to 50 ns, a second high-efficiency short training field sequence formed accordingly in the bandwidth of 20 MHz includes 2.5 cycles in the 4 µs, and duration of each cycle is changed to 1600 ns (for ease of description, this time domain sequence is denoted as a sequence 5).

For example, the first bandwidth is 20 MHz, the second bandwidth is 80 MHz, and duration of a time domain sequence is 4 µs. Because both duration of a time domain sequence of the first bandwidth and duration of a time domain sequence of the second bandwidth are 4 µs, after a sampling rate of the 80 sampling points captured in the bandwidth of 80 MHz (which is equivalent to capturing a time domain sequence of 1.25 cycles) is changed from 12.5 ns to 50 ns, a second high-efficiency short training field sequence formed accordingly in the bandwidth of 20 MHz includes 1.25 cycles in the 4 µs, and duration of each cycle is changed to 3200 ns (for ease of description, this time domain sequence is denoted as a sequence 6).

For example, the first bandwidth is 40 MHz, the second bandwidth is 80 MHz, and duration of a time domain sequence is 4 µs. Because both duration of a time domain sequence of the first bandwidth and duration of a time domain sequence of the second bandwidth are 4 µs, after a sampling rate of the 160 sampling points captured in the bandwidth of 80 MHz (which is equivalent to capturing a time domain sequence of 2.5 cycles) is changed from 12.5 ns to 25 ns, a second high-efficiency short training field sequence formed accordingly in the bandwidth of 40 MHz includes 2.5 cycles in the4 µs, and duration of each cycle is changed to 1600 ns (for ease of description, this time domain sequence is denoted as a sequence 7).

For example, the first bandwidth is 20 MHz, the second bandwidth is 80 MHz, and duration of a time domain sequence is 3.2 µs. Because both duration of a time domain sequence of the first bandwidth and duration of a time domain sequence of the second bandwidth are 3.2 µs, after a sampling rate of 64 sampling points captured in the bandwidth of 80 MHz (which is equivalent to capturing a time domain sequence of one cycle) is changed from 12.5 ns to 50 ns, a second high-efficiency short training field sequence formed accordingly in the bandwidth of 20 MHz includes one cycle in 3.2 µs, and duration of each cycle is changed to 3200 ns (for ease of description, this time domain sequence is denoted as a sequence 8).

Step S213: Use the second high-efficiency short training field sequence as the high-efficiency short training field sequence in the preamble sequence corresponding to the first bandwidth.

In specific implementation, in a WLAN network, a short training field sequence used for performing stage-2 AGC adjustment may be an HT-STF sequence in IEEE 802.11n, or a VHT-STF sequence in IEEE 802.11ac, or an HE-STF (High-Efficiency-Short Training Field, high-efficiency short training field) in a next-generation WLAN network, or another short training field sequence used for performing stage-2 AGC adjustment. With reference to the foregoing examples, in this embodiment of the disclosure, the foregoing sequence 5 to sequence 8 may be used as high-efficiency short training field sequences in a preamble sequence of a data transmission frame corresponding to the first bandwidth in the wireless local area network WLAN.

Specifically, the sequence 5 and the sequence 7 include 2.5 cycles in duration of 4 μs, and a length of each cycle is 1600 ns. Therefore, when the sequence 5 and the sequence 7 are used as high-efficiency short training field sequences in the preamble sequence of the data transmission frame corresponding to the first bandwidth (which is respectively 20 MHz and 40 MHz) in the wireless local area network WLAN, a maximum cyclic shift delay CSD value that can be used in the first bandwidth increases accordingly (changed from 750 ns in the prior art to 1550 ns). Further, better AGC performance can be obtained when two stages of automatic gain control AGC adjustment are performed on a received signal (the maximum CSD value is increased from 750 ns to 1550 ns) in a WLAN system in the bandwidth of 20 MHz or the bandwidth of 40 MHz by respectively using an L-STF in the preamble sequence and the sequence 5 or the sequence 7 with an increased cycle in this embodiment of the disclosure.

Specifically, in duration of 4 μs of the sequence 6 and the sequence 8, a length of each cycle is 1600 ns. Therefore, when the sequence 6 and the sequence 8 are used as a high-efficiency short training field sequence (for example, an HT-STF sequence in IEEE 802.11n, or a VHT-STF sequence in IEEE 802.11ac, or an HE-STF in a next-generation WLAN network) in a preamble sequence of a data transmission frame corresponding to the bandwidth of 20 MHz in the wireless local area network WLAN, a maximum cyclic shift delay CSD value that can be used in the WLAN in the bandwidth of 20 MHz increases accordingly (changed from 750 ns in the prior art to 3150 ns). Further, better AGC performance can be obtained when two stages of automatic gain control AGC adjustment are performed on a received signal in a WLAN system in the bandwidth of 20 MHz by respectively using an L-STF in the preamble sequence and the sequence 6 or the sequence 8 (the maximum cyclic shift delay CSD value that can be used is changed from 750 ns in the prior art to 3150 ns) with an increased cycle in this embodiment of the disclosure.

It may be learned from the foregoing description that, in some feasible implementation manners of the disclosure, a first high-efficiency short training field sequence in a preamble sequence corresponding to a second bandwidth is obtained, where the second bandwidth is greater than a first bandwidth; a segment of sequence is captured from the obtained first high-efficiency short training field sequence, where a quantity of sampling points included in the segment of sequence is a quantity of sampling points corresponding to a high-efficiency short training field sequence in a preamble sequence corresponding to the first bandwidth; a sampling rate of the captured segment of sequence is changed to a sampling rate corresponding to the first bandwidth, to obtain a second high-efficiency short training field sequence; and the second high-efficiency short training field sequence is used as the high-efficiency short training field sequence (for example, an HT-STF sequence in IEEE 802.11n, or a VHT-STF sequence in IEEE 802.11ac, or an HE-STF in a next-generation WLAN network) in the preamble sequence corresponding to the first bandwidth. Therefore, a cycle of the high-efficiency short training field sequence in the preamble sequence corresponding to the first bandwidth is increased, and further, a maximum cyclic shift delay CSD value that can be used in the first bandwidth increases accordingly. Further, better AGC performance can be obtained when two stages of automatic gain control AGC adjustment are performed on a received signal in a WLAN system in the first bandwidth by respectively using an L-STF sequence and a cycle-increased HT-STF sequence or VHT-STF sequence or HE-STF sequence in the preamble sequence.

Figure 8:
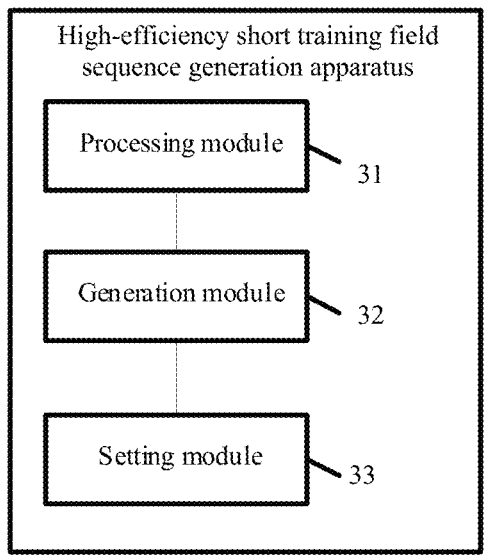
FIG. 8 is a schematic diagram of structural composition of an embodiment of a high-efficiency short training field sequence generation apparatus according to the disclosure.

FIG. 8 is a schematic diagram of structural composition of an embodiment of a high-efficiency short training field sequence generation apparatus according to the disclosure. As shown in FIG. 8, the apparatus may include at least a processing module 31, a generation module 32, and a setting module 33.

The processing module 31 is configured to increase frequency domain density of a frequency domain sequence corresponding to a first high-efficiency short training field sequence to generate a frequency domain sequence with increased frequency domain density.

The generation module 32 is configured to generate a second high-efficiency short training field sequence according to the frequency domain sequence, generated by the processing module 31, with increased frequency domain density.

The setting module 33 is configured to use the second high-efficiency short training field sequence generated by the generation module 32 as a high-efficiency short training field in a preamble sequence of a data transmission frame in a wireless local area network WLAN.

In specific implementation, the first high-efficiency training field sequence in this embodiment of the disclosure may be an HT-STF in the IEEE 802.11n standard or a VHT-STF in the IEEE 802.11ac standard in a WLAN system in the prior art, where duration of a time domain sequence of the HT-STF in IEEE 802.11n is 4 μs (including a cyclic prefix CP), five cycles are included in the 4 μs, and a length of each cycle is 800 ns; duration of a time domain sequence of the VHT-STF in IEEE 802.11ac is also 4 μs, five cycles are also included in the 4 μs, and a length of each cycle is 800 ns. Generally, in a bandwidth of 20 M, a frequency domain sequence corresponding to the HT-STF or the VHT-STF in the WLAN in the prior art is as follows:

Sequence 1:
[0, 0, 0, 0, 0, 0, 0, 0, 1+1i, 0, 0, 0, −1−1i, 0, 0, 0, 1+1i, 0, 0, 0, −1−1i, 0, 0, 0, −1−1i, 0, 0, 0, 1+1i, 0, 0, 0, . . . , 0, 0, 0, −1−1i, 0, 0, 0, −1−1i, 0, 0, 0, +1i, 0, 0, 0, 1+1i, 0, 0, 0, 1+1i, 0, 0, 0, 1+1i, 0, 0, 0, 0, 0, 0, 0]

It may be learned from the sequence 1 that there are three 0s between values in the frequency domain sequence of the HT-STF or the VHT-STF in the original bandwidth of 20 M.

In specific implementation, the frequency domain sequence corresponding to the first high-efficiency short training field sequence in this embodiment of the disclosure may be a frequency domain sequence obtained after frequency domain density of the frequency domain sequence corresponding to the VHT-STF or the HT-STF in the WLAN system in the prior art is increased once or multiple times by using the method in the disclosure. Specifically, in step S110, a quantity of 0s between non-zero values in the frequency domain sequence corresponding to the first high-efficiency short training field sequence may be reduced, so as to increase the frequency domain density. For example, three 0s between values in the sequence 1 may be reduced to two 0s or one 0. For a specific sequence obtained after frequency domain density of the sequence 1 is increased, refer to a sequence 2 and a sequence 3.

Sequence 2:
[0, 0, 0, 0, 0, 0, 0, 0, 1+1i, 0, 0, −1−1i, 0, 0, −1−1i, 0, 0, −1−1i, 0, 0, 1+1i, 0, 0, . . . , 0, 0, −1−i, 0, 0, −1−1i, 0, 0, −1−1i, 0, 0, 1+1i, 0, 0, 1+1i, 0, 0, 1+1i, 0, 0, 0, 0, 0, 0]

Sequence 3:
[0, 0, 0, 0, 0, 0, 0, 0, 1+1i, 0, −1−1i, 0, −1−1i, 0, −1−1i, 0, 1+1i, 0, . . . , 0, −1−1i, 0, −1−1i, 0, −1−1i, 0, 1+1i, 0, 1+1i, 0, 1+1i, 0, 0, 0, 0, 0, 0]

It may be learned from the sequence 2 and the sequence 3 that, in the bandwidth of 20 M, when three 0s between values in the frequency domain sequence of the HT-STF or the VHT-STF are changed to two 0s or one 0, cycle lengths of corresponding time domain sequences are increased by 4/3 times and 2 times respectively, 3.75 cycles and 2.5 cycles may be respectively included in duration of 4 µs, and lengths of the cycles are respectively 3200/3 ns and 1600 ns.

In specific implementation, alternatively, the frequency domain sequence of the first high-efficiency short training field in this embodiment of the disclosure may be a frequency domain sequence formed by transforming a segment of time domain sequence captured from a time domain sequence of a VHT-STF or an HT-STF in a large bandwidth. For example, in a bandwidth of 40 MHz 2.5 cycles (including 80 sampling points) are captured from a time domain sequence of 4 µs of a VHT-STF or an HT-STF, and the 80 sampling points in the captured 2.5 cycles are then transformed according to a sampling rate at 20 MHz, so that a segment of time domain sequence whose time domain cycle is lengthened in 20 MHz may be obtained. Then, the time domain sequence whose time domain cycle is lengthened in 20 MHz is transformed into a frequency domain sequence according to a transformation relationship between a time domain sequence and a frequency domain sequence. In specific implementation, in the bandwidth of 40 MHz, the time domain sequence of 4 µs of the VHT-STF or the HT-STF includes five cycles, and includes 160 sampling points, where each cycle is 800 ns. After 80 sampling points in 2.5 cycles are captured, and are transformed according to the sampling rate at 20 MHz, an obtained time domain sequence includes 2.5 cycles in the 4 µs, and each cycle is changed to 1600 ns. The time sequence is transformed into a frequency domain sequence, and a time domain sequence is formed after frequency domain density is increased, and includes less than 2.5 cycles in 4 µs. Duration of each cycle is greater than 1600 ns.

In specific implementation, a WLAN standard supports multiple types of bandwidth configurations such as 20 MHz, 40 MHz, 80 MHz, and 160 MHz, where 20 MHz is a minimum bandwidth. In the existing WLAN standard, a frequency domain sequence (for example, the foregoing sequence 1) of a short training field STF is defined in a bandwidth of 20 MHz, and a frequency domain sequence of an STF in a larger bandwidth is obtained by repeating the STF sequence in a frequency domain, and by adding phase rotation. For example, an STF frequency domain in the bandwidth of 20 MHz is [L-STF], and an STF frequency domain in the bandwidth of 40 MHz is [1*L-STF, j*L-LTF].

In specific implementation, a method used by the processing module 31 for increasing the frequency domain density of the frequency domain sequence of the first high-efficiency short training field in this embodiment of the disclosure is reducing a quantity of 0s between non-zero values in the frequency domain sequence. As exemplified above, both the sequence 2 and the sequence 3 are frequency domain sequences generated after the frequency density of the sequence 1 is increased. Alternatively, in this embodiment of the disclosure, a quantity of 0s between non-zero values in the frequency domain sequence obtained by transforming the time domain sequence whose time domain cycle is lengthened in 20 MHz may be increased, so as to obtain a frequency domain sequence 4 with increased frequency domain density.

Specifically, the generation module 32 may specifically perform inverse Fourier transform on the frequency domain sequence with increased frequency domain density, and add a cyclic prefix, so as to obtain the second high-efficiency short training field sequence. Alternatively, the generation module 32 may specifically perform inverse Fourier transform on the frequency domain sequence with increased frequency domain density, so as to obtain the second high-efficiency short training field sequence.

In specific implementation, in the WLAN network, a short training field sequence used for performing stage-2 AGC adjustment may be an HT-STF sequence in IEEE 802.11n, or a VHT-STF sequence in IEEE 802.11ac, or an HE-STF (High-Efficiency-Short Training Field, high-efficiency short training field) in a next-generation WLAN network, or another short training field sequence used for performing stage-2 AGC adjustment.

With reference to the foregoing examples, in this embodiment of the disclosure, the setting module 33 may use time domain sequences corresponding to the sequence 2 and the sequence 3 as the high-efficiency short training field sequence in the preamble sequence of the data transmission frame in the wireless local area network WLAN. Alternatively, in this embodiment of the disclosure, a time domain sequence corresponding to the frequency domain sequence 4 may be used as the high-efficiency short training field sequence in the preamble sequence of the data transmission frame in the wireless local area network WLAN.

With reference to the foregoing examples, the sequence 2 and the sequence 3 include 2.5 cycles in the duration of 4 µs, and a length of each cycle is 1600 ns. When the time domain sequences corresponding to the sequence 2 and the sequence 3 are used as the high-efficiency short training field sequence (for example, the HT-STF sequence in IEEE 802.11n, or the VHT-STF sequence in IEEE 802.11ac, or the HE-STF in the next-generation WLAN network) in the preamble sequence of the data transmission frame in the wireless local area network WLAN, a maximum cyclic shift delay CSD value that can be used in the WLAN increases accordingly (when the sequence 3 is used, a CSD value is changed from 750 ns in the prior art to 1550 ns). Further, better AGC performance can be obtained when two stages of automatic gain control AGC adjustment are performed on a received signal in a WLAN system by respectively using an L-STF in the preamble sequence and a cycle-increased short training field sequence that is used for performing stage-2 AGC adjustment in the second high-efficiency short training field in this embodiment of the disclosure. With reference to the foregoing examples, the time domain sequence corresponding to the frequency domain sequence 4 includes less than 2.5 cycles in 4 µs, and duration of each cycle is greater than 1600 ns. In this way, when a time domain sequence whose cycle duration is greater than 1600 ns is used as the high-efficiency short training field sequence (for example, the HT-STF sequence in IEEE 802.11n, or the VHT-STF sequence in IEEE 802.11ac, or the HE-STF in the next-generation WLAN network) in the preamble sequence of the data transmission frame in the wireless local area network WLAN, a maximum cyclic shift delay CSD value that can be used in the WLAN increases accordingly (changed from 750 ns in the prior art to be greater than 1550 ns). Further, better AGC performance can be obtained when two stages of automatic gain control AGC adjustment are performed on a received signal in a WLAN system by respectively using an L-STF in the preamble sequence and a cycle-increased short training field sequence that is used for performing stage-2 AGC adjustment in the second high-efficiency short training field in this embodiment of the disclosure.

In specific implementation, both the first high-efficiency short training field sequence and the second high-efficiency short training field sequence enumerated above in this embodiment of the disclosure are sequences to which cyclic prefixes CPs are added. In specific implementation, when no cyclic prefix CP is added, in each bandwidth, duration of the first high-efficiency short training field sequence and duration of the second high-efficiency short training field sequence in this embodiment of the disclosure may be 3.2 µs or another value. When the duration of the first high-efficiency short training field sequence and the duration of the second high-efficiency short training field sequence are 3.2 µs, four cycles are included, and duration of each cycle is 800 ns.

It may be learned from the foregoing description that, in some feasible implementation manners of the disclosure, frequency domain density of a frequency domain sequence corresponding to a first high-efficiency short training field sequence is increased to generate a frequency domain sequence with increased frequency domain density; a second high-efficiency short training field sequence is generated according to the frequency domain sequence with increased frequency domain density; and the second high-efficiency short training field sequence is used as a high-efficiency short training field sequence (for example, an HT-STF sequence in IEEE 802.11n, or a VHT-STF sequence in IEEE 802.11ac, or an HE-STF (High-Efficiency-Short Training Field, high-efficiency short training field) in a next-generation WLAN network) in a preamble sequence of a data transmission frame in a wireless local area network WLAN. Therefore, a cycle of the high-efficiency short training sequence in the preamble sequence of the data transmission frame in the WLAN in this embodiment of the disclosure is increased relative to a cycle of the existing HT-STF sequence in IEEE 802.11n or a cycle of the existing VHT-STF sequence in IEEE 802.11ac in the prior art, and further, a maximum cyclic shift delay CSD value that can be used in the WLAN increases accordingly. Further, better AGC performance can be obtained when two stages of automatic gain control AGC adjustment are performed on a received signal in a WLAN system by respectively using an L-STF sequence and a cycle-increased HT-STF sequence or VHT-STF sequence or HE-STF sequence in the preamble sequence.

Figure 9:
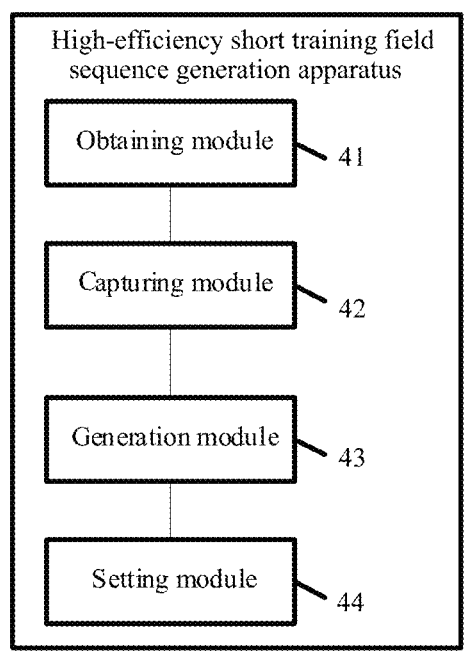
FIG. 9 is a schematic diagram of structural composition of another embodiment of a high-efficiency short training field sequence generation apparatus according to the disclosure.

FIG. 9 is a schematic diagram of procedure composition of another embodiment of a high-efficiency short training field sequence generation apparatus according to the disclosure. As shown in FIG. 9, the apparatus may include at least an obtaining module 41, a capturing module 42, a generation module 43, and a setting module 44.

The obtaining module 41 is configured to obtain a first high-efficiency short training field sequence in a preamble sequence corresponding to a second bandwidth, where the second bandwidth is greater than a first bandwidth.

The capturing module 42 is configured to capture a segment of sequence from the first high-efficiency short training field sequence obtained by the obtaining module 41, where a quantity of sampling points included in the segment of sequence is a quantity of sampling points corresponding to a high-efficiency short training field sequence in a preamble sequence corresponding to the first bandwidth.

The generation module 43 is configured to change a sampling rate of the segment of sequence captured by the capturing module 42 to a sampling rate corresponding to the first bandwidth, to obtain a second high-efficiency short training field sequence.

The setting module 44 is configured to use the second high-efficiency short training field sequence generated by the generation module 43 as the high-efficiency short training field sequence in the preamble sequence corresponding to the first bandwidth.

In specific implementation, a WLAN standard supports multiple types of bandwidth configurations such as 20 MHz, 40 MHz, 80 MHz, and 160 MHz, where 20 MHz is a minimum bandwidth. In the existing WLAN standard, a frequency domain sequence (for example, the foregoing sequence 1) of a short training field STF is defined in a bandwidth of 20 MHz, and a frequency domain sequence of an STF in a larger bandwidth is obtained by repeating the STF sequence in a frequency domain, and by adding phase rotation. For example, an STF frequency domain in the bandwidth of 20 MHz is [L-STF], and an STF frequency domain in a bandwidth of 40 MHz is [1*L-STF, j*L-LTF]. In various bandwidths, duration of a time domain sequence of an HT-STF or a VHT-STF is 4 µs. Differently, a larger bandwidth indicates denser sampling points used by the time domain sequence. In this way, a larger bandwidth indicates a longer STF time domain sequence corresponding to the HT-STF or the VHT-STF. For the WLAN standard, the first bandwidth may be any one of 20 MHz, 40 MHz, or 80 MHz, provided that the second bandwidth is greater than the first bandwidth. For example, when the first bandwidth is 20 MHz, the second bandwidth may be any one of 40 MHz, 80 MHz, or 160 MHz. When the first bandwidth is 40 MHz, the second bandwidth may be either 80 MHz or 160 MHz. When the first bandwidth is 80 MHz, the second bandwidth may be 160 MHz. Certainly, in specific implementation, the first bandwidth and the second bandwidth used in this embodiment of the disclosure may not be limited to the foregoing enumerated values.

In specific implementation, for the bandwidth of 20 MHz, in duration of 4 µs (including a cyclic prefix CP), a high-efficiency short training field (for example, an HT-STF sequence in IEEE 802.11n, or a VHT-STF sequence in IEEE 802.11ac, or an HE-STF (High-Efficiency-Short Training Field, high-efficiency short training field) in a next-generation WLAN network) sequence includes 80 sampling points. For the bandwidth of 40 MHz, in duration of 4 µs, a high-efficiency short training field sequence (for example, an HT-STF sequence in IEEE 802.11n, or a VHT-STF sequence in IEEE 802.11ac, or an HE-STF (High-Efficiency-Short Training Field, high-efficiency short training field) in a next-generation WLAN network) includes 160 sampling points. For the bandwidth of 80 MHz, in duration of 4 µs, a high-efficiency short training field sequence (for example, an HT-STF sequence in IEEE 802.11n, or a VHT-STF sequence in IEEE 802.11ac, or an HE-STF (High-Efficiency-Short Training Field, high-efficiency short training field) in a next-generation WLAN network) includes 320 sampling points. Duration of the bandwidth of 20 MHz, duration of the bandwidth of 40 MHz, and duration of the bandwidth of 80 MHz in a time domain are 4 μs each. Therefore, capturing may be performed on a high-efficiency short training field sequence in the bandwidth of 40 MHz or 80 MHz, and digital-to-analog conversion is then performed on a captured time domain sequence according to a sampling rate (50 ns) corresponding to the bandwidth of 20 MHz, so that a high-efficiency short training field sequence with an increased time domain cycle in 20 MHz is obtained. In specific implementation, before capturing is performed, the captured time domain sequence in this embodiment of the disclosure is formed by transforming a precoded frequency domain sequence.

In specific implementation, for the bandwidth of 20 MHz, in duration of 3.2 μs (including no cyclic prefix CP), a high-efficiency short training field sequence (for example, an HT-STF sequence in IEEE 802.11n, or a VHT-STF sequence in IEEE 802.11ac, or an HE-STF (High-Efficiency-Short Training Field, high-efficiency short training field) in a next-generation WLAN network) includes 64 sampling points. For the bandwidth of 40 MHz, in duration of 3.2 μs, a high-efficiency short training field sequence (for example, an HT-STF sequence in IEEE 802.11n, or a VHT-STF sequence in IEEE 802.11ac, or an HE-STF (High-Efficiency-Short Training Field, high-efficiency short training field) in a next-generation WLAN network) includes 128 sampling points. For the bandwidth of 80 MHz, in duration of 3.2 μs, a high-efficiency short training field sequence (for example, an HT-STF sequence in IEEE 802.11n, or a VHT-STF sequence in IEEE 802.11ac, or an HE-STF (High-Efficiency-Short Training Field, high-efficiency short training field) in a next-generation WLAN network) includes 256 sampling points. Duration of the bandwidth of 20 MHz, duration of the bandwidth of 40 MHz, and duration of the bandwidth of 80 MHz in a time domain are 3.2 μs each. Therefore, capturing may be performed on a time domain sequence of a short training field in the bandwidth of 40 MHz or 80 MHz, and digital-to-analog conversion is then performed on a captured time domain sequence according to a sampling rate (50 ns) corresponding to the bandwidth of 20 MHz, so that a time domain sequence of a short training field with an increased time domain cycle in 20 MHz is obtained.

In specific implementation, in the bandwidth of 20 MHz, a corresponding sampling rate is 50 ns; in the bandwidth of 40 MHz, a corresponding sampling rate is 25 ns; in the bandwidth of 80 MHz, a corresponding sampling rate is 12.5 ns; in the bandwidth of 160 MHz, a corresponding sampling rate is 6.25 ns.

In specific implementation, when the first bandwidth is 20 MHz, the second bandwidth may be any one of 40 MHz, 80 MHz, or 160 MHz. The first high-efficiency short training field sequence may be a sequence including 160 sampling points in the duration of 4 μs in 40 MHz, or may be a sequence including 320 sampling points in the duration of 4 μs in the bandwidth of 80 MHz, or may be a sequence including 640 sampling points in the duration of 4 μs in the bandwidth of 160 MHz. When the first bandwidth is 40 MHz, the second bandwidth may be either 80 MHz or 160 MHz. The first high-efficiency short training field sequence may be a sequence including 320 sampling points in the duration of 4 μs in the bandwidth of 80 MHz, or may be a sequence including 640 sampling points in the duration of 4 μs in the bandwidth of 160 MHz. When the first bandwidth is 80 MHz, the second bandwidth may be 160 MHz. The first high-efficiency short training field sequence may be a sequence including 640 sampling points in the duration of 4 μs in the bandwidth of 160 MHz.

Further, in some embodiments, the first high-efficiency short training field sequence in the disclosure may include five cycles in the duration of 4 μs, and a length of each cycle is 800 ns.

In specific implementation, when capturing the segment of sequence from the obtained first high-efficiency short training field sequence, the capturing module 42 captures the segment of sequence in normal order according to a preset start position from the first high-efficiency short training field sequence in the preamble sequence corresponding to the second bandwidth. Generally, the captured segment of sequence should include at least one cycle.

For example, the first bandwidth is 20 MHz, the second bandwidth is 40 MHz, and duration of a time domain sequence is 4 μs. The capturing module 42 in this embodiment of the disclosure may capture 80 sampling points in normal order according to a preset start position (for example, a start position or a non-start position of a high-efficiency short training field sequence in the bandwidth of 40 MHz) from 160 sampling points in the high-efficiency short training field sequence in the bandwidth of 40 MHz (which is equivalent to capturing a time domain sequence of 2.5 cycles).

For example, the first bandwidth is 20 MHz, the second bandwidth is 80 MHz, and duration of a time domain sequence is 4 μs. The capturing module 42 in this embodiment of the disclosure may capture 80 sampling points in normal order according to a preset start position (for example, a start position or a non-start position of a high-efficiency short training field sequence of a short training field in the bandwidth of 80 MHz) from 320 sampling points in a time domain sequence of a short training field in the bandwidth of 80 MHz (which is equivalent to capturing a time domain sequence of 1.25 cycles).

In specific implementation, when capturing the segment of sequence from the obtained first high-efficiency short training field sequence, the capturing module 42 captures the segment of sequence in reverse order according to a preset end position from the first high-efficiency short training field sequence in the preamble sequence corresponding to the second bandwidth.

For example, the first bandwidth is 40 MHz, the second bandwidth is 80 MHz, and duration of a time domain sequence is 4 μs. The capturing module 42 in this embodiment of the disclosure may capture 160 sampling points in reverse order according to a preset end position (for example, an end position or a non-end position of a high-efficiency short training field sequence in the bandwidth of 80 MHz) from 320 sampling points in the high-efficiency short training field sequence in the bandwidth of 80 MHz (which is equivalent to capturing a time domain sequence of 2.5 cycles).

For example, the first bandwidth is 20 MHz, the second bandwidth is 80 MHz, and duration of a time domain sequence is 4 μs. The capturing module 42 in this embodiment of the disclosure may capture 80 sampling points in reverse order according to a preset end position (for example, an end position or a non-end position of a high-efficiency short training field sequence in the bandwidth of 80 MHz) from 320 sampling points in the high-efficiency short training field sequence in the bandwidth of 80 MHz (which is equivalent to capturing a time domain sequence of 1.25 cycles).

For example, the first bandwidth is 20 MHz, the second bandwidth is 40 MHz, and duration of a time domain sequence is 4 μs. Because both duration of a time domain sequence of the first bandwidth and duration of a time domain sequence of the second bandwidth are 4 μs, after a sampling rate of the 80 sampling points captured in the bandwidth of 40 MHz (which is equivalent to capturing a time domain sequence of 2.5 cycles) is changed from 25 ns to 50 ns by using the generation module 43, a second high-efficiency short training field sequence formed accordingly in the bandwidth of 20 MHz includes 2.5 cycles in the 4 μs, and duration of each cycle is changed to 1600 ns (for ease of description, this time domain sequence is denoted as a sequence 5).

For example, the first bandwidth is 20 MHz, the second bandwidth is 80 MHz, and duration of a time domain sequence is 4 μs. Because both duration of a time domain sequence of the first bandwidth and duration of a time domain sequence of the second bandwidth are 4 μs, after a sampling rate of the 80 sampling points captured in the bandwidth of 80 MHz (which is equivalent to capturing a time domain sequence of 1.25 cycles) is changed from 12.5 ns to 50 ns by using the generation module 43, a second high-efficiency short training field sequence formed accordingly in the bandwidth of 20 MHz includes 1.25 cycles in the 4 μs, and duration of each cycle is changed to 3200 ns (for ease of description, this time domain sequence is denoted as a sequence 6).

For example, the first bandwidth is 40 MHz, the second bandwidth is 80 MHz, and duration of a time domain sequence is 4 μs. Because both duration of a time domain sequence of the first bandwidth and duration of a time domain sequence of the second bandwidth are 4 μs, after a sampling rate of the 160 sampling points captured in the bandwidth of 80 MHz (which is equivalent to capturing a time domain sequence of 2.5 cycles) is changed from 12.5 ns to 25 ns by using the generation module 43, a second high-efficiency short training field sequence formed accordingly in the bandwidth of 40 MHz includes 2.5 cycles in the 4 μs, and duration of each cycle is changed to 1600 ns (for ease of description, this time domain sequence is denoted as a sequence 7).

For example, the first bandwidth is 20 MHz, the second bandwidth is 80 MHz, and duration of a time domain sequence is 3.2 μs. Because both duration of a time domain sequence of the first bandwidth and duration of a time domain sequence of the second bandwidth are 3.2 μs, after a sampling rate of 64 sampling points captured in the bandwidth of 80 MHz (which is equivalent to capturing a time domain sequence of one cycle) is changed from 12.5 ns to 50 ns by using the generation module 43, a second high-efficiency short training field sequence formed accordingly in the bandwidth of 20 MHz includes one cycle in 3.2 μs, and duration of each cycle is changed to 3200 ns (for ease of description, this time domain sequence is denoted as a sequence 8).

In specific implementation, in a WLAN network, a short training field sequence used for performing stage-2 AGC adjustment may be an HT-STF sequence in IEEE 802.11n, or a VHT-STF sequence in IEEE 802.11ac, or an HE-STF (High-Efficiency-Short Training Field, high-efficiency short training field) in a next-generation WLAN network, or another short training field sequence used for performing stage-2 AGC adjustment.

With reference to the foregoing examples, the setting module 44 in this embodiment of the disclosure may use the foregoing sequence 5 to sequence 8 as the high-efficiency short training field sequence in the preamble sequence of the data transmission frame corresponding to the first bandwidth in the wireless local area network WLAN.

Specifically, the sequence 5 and the sequence 7 include 2.5 cycles in duration of 4 μs, and a length of each cycle is 1600 ns. Therefore, when the setting module 44 uses the sequence 5 and the sequence 7 as the high-efficiency short training field sequence in the preamble sequence of the data transmission frame corresponding to the first bandwidth (which is respectively 20 MHz and 40 MHz) in the wireless local area network WLAN, a maximum cyclic shift delay CSD value that can be used in the first bandwidth increases accordingly (changed from 750 ns in the prior art to 1550 ns). Further, better AGC performance can be obtained when two stages of automatic gain control AGC adjustment are performed on a received signal (the maximum CSD value is increased from 750 ns to 1550 ns) in a WLAN system in the bandwidth of 20 MHz or the bandwidth of 40 MHz by respectively using an L-STF in the preamble sequence and the sequence 5 or the sequence 7 with an increased cycle in this embodiment of the disclosure.

Specifically, in duration of 4 μs of the sequence 6 and the sequence 8, a length of each cycle is 1600 ns. Therefore, when the setting module 44 uses the sequence 6 and the sequence 8 as a high-efficiency short training field sequence (for example, an HT-STF sequence in IEEE 802.11n, or a VHT-STF sequence in IEEE 802.11ac, or an HE-STF in a next-generation WLAN network) in a preamble sequence of a data transmission frame corresponding to the bandwidth of 20 MHz in the wireless local area network WLAN, a maximum cyclic shift delay CSD value that can be used in the WLAN in the bandwidth of 20 MHz increases accordingly (changed from 750 ns in the prior art to 3150 ns). Further, better AGC performance can be obtained when two stages of automatic gain control AGC adjustment are performed on a received signal in a WLAN system in the bandwidth of 20 MHz by respectively using an L-STF in the preamble sequence and the sequence 6 or the sequence 8 (the maximum cyclic shift delay CSD value that can be used is changed from 750 ns in the prior art to 3150 ns) with an increased cycle in this embodiment of the disclosure.

It may be learned from the foregoing description that, in some feasible implementation manners of the disclosure, a first high-efficiency short training field sequence in a preamble sequence corresponding to a second bandwidth is obtained, where the second bandwidth is greater than a first bandwidth; a segment of sequence is captured from the obtained first high-efficiency short training field sequence, where a quantity of sampling points included in the segment of sequence is a quantity of sampling points corresponding to a high-efficiency short training field sequence in a preamble sequence corresponding to the first bandwidth; a sampling rate of the captured segment of sequence is changed to a sampling rate corresponding to the first bandwidth, to obtain a second high-efficiency short training field sequence; and the second high-efficiency short training field sequence is used as the high-efficiency short training field sequence (for example, an HT-STF sequence in IEEE 802.11n, or a VHT-STF sequence in IEEE 802.11ac, or an HE-STF in a next-generation WLAN network) in the preamble sequence corresponding to the first bandwidth. Therefore, a cycle of the high-efficiency short training field sequence in the preamble sequence corresponding to the first bandwidth is increased, and further, a maximum cyclic shift delay CSD value that can be used in the first bandwidth increases accordingly. Further, better AGC performance can be obtained when two stages of automatic gain control AGC adjustment are performed on a received signal in a WLAN system in the first bandwidth by respectively using an L-STF sequence and a cycle-increased HT-STF sequence or VHT-STF sequence or HE-STF sequence in the preamble sequence.

Figure 10:
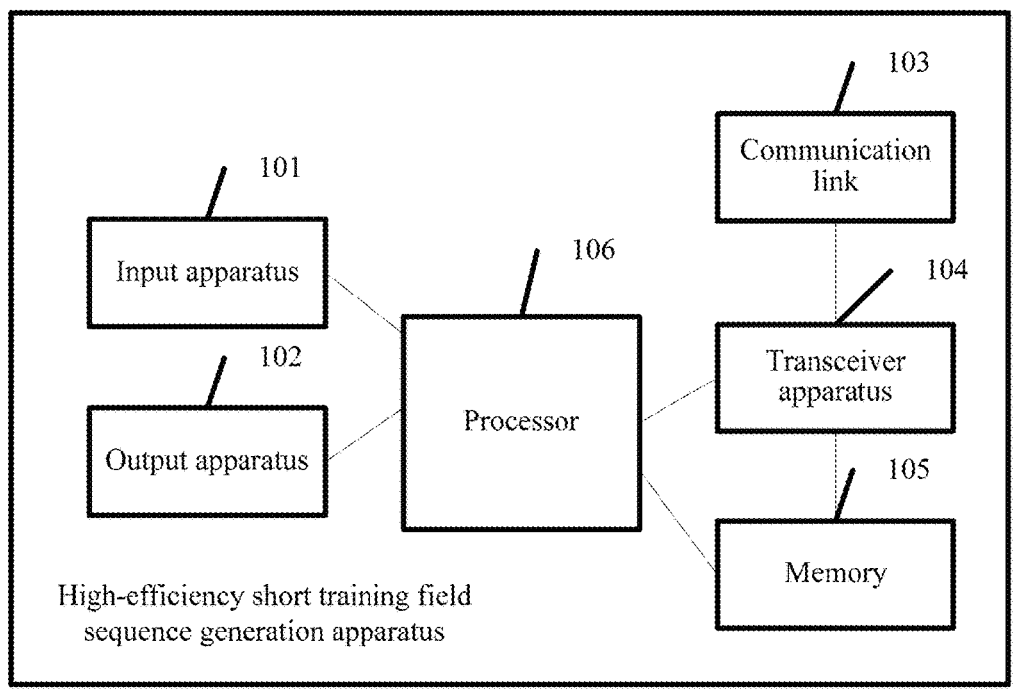
FIG. 10 is a schematic diagram of structural composition of another embodiment of a high-efficiency short training field sequence generation apparatus according to the disclosure.

FIG. 10 is a schematic diagram of structural composition of another embodiment of a high-efficiency short training field sequence generation apparatus according to the disclosure. As shown in FIG. 10, the short training field generation apparatus in this embodiment may include an input apparatus 101, an output apparatus 102, a communication link 103, a transceiver apparatus 104, a memory 105, and a processor 106.

The input apparatus 101 is configured to receive input data that is input into the high-efficiency short training field sequence generation apparatus from the outside.

In specific implementation, the input apparatus 101 in this embodiment of the disclosure may include a keyboard, a mouse, a photoelectronic input apparatus, a voice input apparatus, a touch-based input apparatus, a scanner, and the like.

The output apparatus 102 is configured to output output data of the high-efficiency short training field sequence generation apparatus to the outside. In specific implementation, the output apparatus 102 in this embodiment of the disclosure may include a display, a loudspeaker, a printer, and the like.

The communication link 103 is configured to establish a communication connection between the high-efficiency short training field sequence generation apparatus and another device. In specific implementation, the communication link 103 in this embodiment of the disclosure may be an instance of a propagation medium. The propagation medium may generally substantialize a computer readable instruction, a data structure, a program module, or other data in a form of another modulated data signal (such as a carrier or another transport mechanism). For example, the propagation medium may include a wired medium such as a wired network or a direct-wired connection. Alternatively, the propagation medium may include a wired medium such as a sound wave, a radio frequency, or an infrared ray.

The transceiver apparatus 104 is configured to communicate with the another device by using the communication link 103, for example, transmitting and receiving data. In specific implementation, the transceiver apparatus 104 may be an antenna or another transceiver apparatus.

The memory 105 is configured to store program data with various functions. In specific implementation, the memory 105 in this embodiment of the disclosure may be a system memory such as a volatile memory (such as a RAM), a non-volatile memory (such as a ROM and a flash memory), or a combination of a volatile memory and a non-volatile memory. In specific implementation, alternatively, the memory 105 in this embodiment of the disclosure may be an external memory outside a system, such as a magnetic disk, a disc, or a magnetic tape.

The processor 106 is configured to call the program data stored in the memory 105 to execute the following operations:

increasing frequency domain density of a frequency domain sequence corresponding to a first high-efficiency short training field sequence to generate a frequency domain sequence with increased frequency domain density;

generating a second high-efficiency short training field sequence according to the frequency domain sequence with increased frequency domain density; and using the second high-efficiency short training field sequence as a high-efficiency short training field sequence in a preamble sequence of a data transmission frame in a wireless local area network WLAN.

In some feasible implementation manners, that the processor 106 performs the step of generating a second high-efficiency short training field sequence according to the frequency domain sequence with increased frequency domain density includes:

performing inverse Fourier transform on the frequency domain sequence with increased frequency domain density, and adding a cyclic prefix, so as to obtain the second high-efficiency short training field sequence.

In some feasible implementation manners, non-zero values in the frequency domain sequence corresponding to the first high-efficiency short training field sequence are successively 1+1i, −1−1i, 1+1i, −1−1i, −1−1i, 1+1i, −1−1i, −1−1i, 1+1i, 1+1i, 1+1i, and 1+1i, and a quantity of zero values between neighboring non-zero values is 3 or 2.

Figure 11:
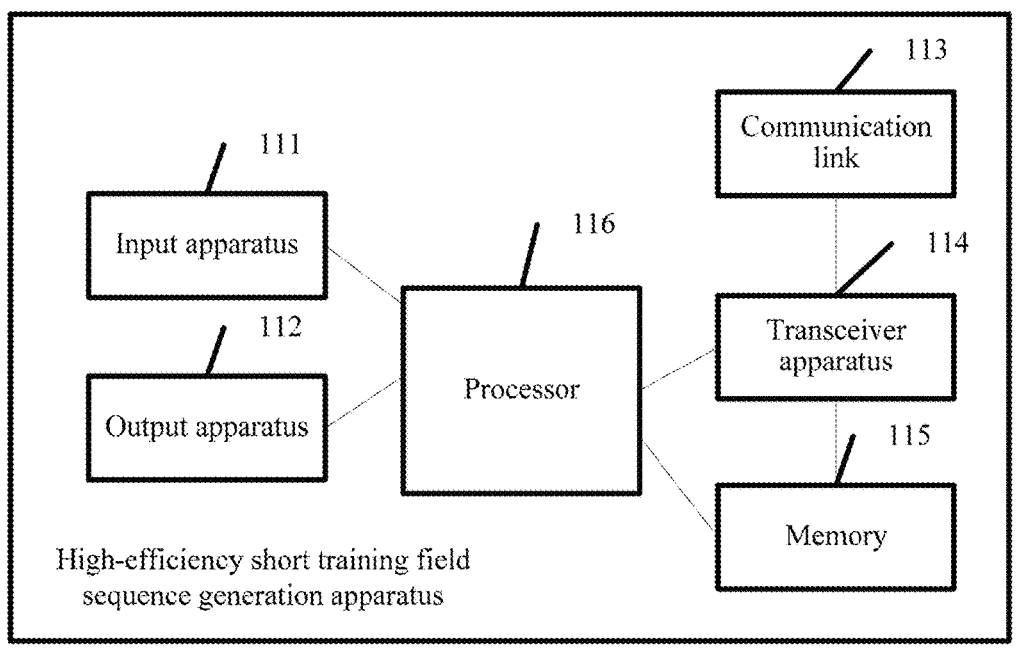
FIG. 11 is a schematic diagram of structural composition of another embodiment of a high-efficiency short training field sequence generation apparatus according to the disclosure.

FIG. 11 is a schematic diagram of structural composition of another embodiment of a high-efficiency short training field sequence generation apparatus according to the disclosure. As shown in FIG. 11, the high-efficiency short training field sequence generation apparatus in this embodiment may include an input apparatus 111, an output apparatus 112, a communication link 113, a transceiver apparatus 114, a memory 115, and a processor 116.

The input apparatus 111 is configured to receive input data that is input into the high-efficiency short training field sequence generation apparatus from the outside. In specific implementation, the input apparatus 111 in this embodiment of the disclosure may include a keyboard, a mouse, a photoelectronic input apparatus, a voice input apparatus, a touch-based input apparatus, a scanner, and the like.

The output apparatus 112 is configured to output output data of the high-efficiency short training field sequence generation apparatus to the outside. In specific implementation, the output apparatus 112 in this embodiment of the disclosure may include a display, a loudspeaker, a printer, and the like.

The communication link 113 is configured to establish a communication connection between the high-efficiency short training field sequence generation apparatus and another device. In specific implementation, the communication link 113 in this embodiment of the disclosure may be an instance of a propagation medium. The propagation medium may generally substantialize a computer readable instruction, a data structure, a program module, or other data in a form of another modulation data signal (such as a carrier or another transport mechanism). For example, the propagation medium may include a wired media such as a wired network or a direct-wired connection. Alternatively, the propagation medium may include a wired medium such as a sound wave, a radio frequency, or an infrared ray.

The transceiver apparatus 114 is configured to communicate with the another device by using the communication link 113, for example, transmitting and receiving data. In specific implementation, the transceiver apparatus 114 may be an antenna or another transceiver apparatus.

The memory 115 is configured to store program data with various functions. In specific implementation, the memory 115 in this embodiment of the disclosure may be a system memory such as a volatile memory (such as a RAM), a non-volatile memory (such as a ROM and a flash memory), or a combination of a volatile memory and a non-volatile memory. In specific implementation, alternatively, the memory 115 in this embodiment of the disclosure may be an external memory outside a system, such as a magnetic disk, a disc, or a magnetic tape.

The processor 116 is configured to call the program data stored in the memory 115 to execute the following operations:

obtaining a first high-efficiency short training field sequence in a preamble sequence corresponding to a second bandwidth, where the second bandwidth is greater than a first bandwidth;

capturing a segment of sequence from the obtained first high-efficiency short training field sequence, where a quantity of sampling points included in the segment of sequence is a quantity of sampling points corresponding to a high-efficiency short training field sequence in a preamble sequence corresponding to the first bandwidth;

changing a sampling rate of the captured segment of sequence to a sampling rate corresponding to the first bandwidth, to obtain a second high-efficiency short training field sequence; and using the second high-efficiency short training field sequence as the high-efficiency short training field sequence in the preamble sequence corresponding to the first bandwidth.

In some feasible implementation manners, when performing the step of capturing a segment of sequence from the obtained first high-efficiency short training field sequence, the processor 116 specifically captures the segment of sequence in normal order according to a preset start position from the first high-efficiency short training field sequence in the preamble sequence corresponding to the second bandwidth.

In some feasible implementation manners, when performing the step of capturing a segment of sequence from the obtained first high-efficiency short training field sequence, the processor 116 specifically captures the segment of sequence in reverse order according to a preset end position from the first high-efficiency short training field sequence in the preamble sequence corresponding to the second bandwidth.

In some feasible implementation manners, the first high-efficiency short training field sequence in the preamble sequence corresponding to the second bandwidth includes no cyclic prefix.

In some feasible implementation manners, the first high-efficiency short training field sequence in the preamble sequence corresponding to the second bandwidth is formed by transforming a precoded frequency domain sequence.

In some feasible implementation manners, the first high-efficiency short training field sequence in the preamble sequence corresponding to the second bandwidth has duration of 4 µs and includes five cycles, and a length of each cycle is 800 ns.

Accordingly, the embodiments of the disclosure further disclose a signal sending method, a signal receiving method, and related apparatuses.

Figure 12:
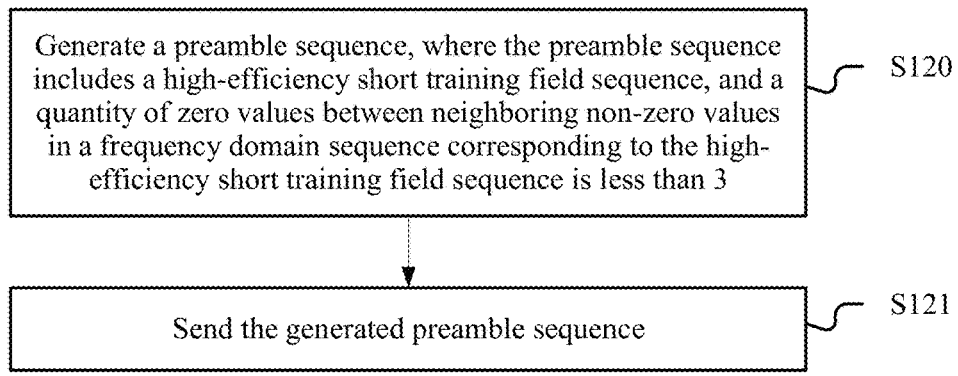
FIG. 12 is a schematic flowchart of an embodiment of a signal sending method according to the disclosure.

FIG. 12 is a schematic flowchart of an embodiment of a signal sending method according to the disclosure. As shown in FIG. 12, the method may include the following steps.

Step S120: Generate a preamble sequence, where the preamble sequence includes a high-efficiency short training field sequence, and a quantity of zero values between neighboring non-zero values in a frequency domain sequence corresponding to the high-efficiency short training field sequence is less than 3.

In specific implementation, the high-efficiency short training field sequence in this embodiment may be various high-efficiency short training field sequences generated in the foregoing high-efficiency short training sequence method in the embodiment shown in FIG. 6 of the disclosure. Certainly, alternatively, the high-efficiency short training field in this embodiment may be a sequence generated according to another high-efficiency short training method.

Step S121: Send the generated preamble sequence.

In some feasible implementation manners, non-zero values in the frequency domain sequence in this embodiment are successively 1+1i, −1−i, 1+1i, −1−1i, −1−1i, 1+1i, −1−1i, 1−1−1i, 1+1i, 1+1i, 1+1i, and 1+1i. For the entire frequency domain sequence, refer to the foregoing sequence 1.

In some feasible implementation manners, the quantity of zero values between neighboring non-zero values in the frequency domain sequence corresponding to the high-efficiency short training field sequence in this embodiment is 1 or 2. For example, the frequency domain sequence in which the quantity of zero values between neighboring non-zero values is 1 or 2 is the foregoing sequence 2 or sequence 3.

It may be learned from the foregoing description that, in some feasible implementation manners of the disclosure, a preamble sequence is generated, where the preamble sequence includes a high-efficiency short training field sequence (for example, an HT-STF sequence in IEEE 802.11n, or a VHT-STF sequence in IEEE 802.11ac, or an HE-STF in a next-generation WLAN network), and a quantity of zero values between neighboring non-zero values in a frequency domain sequence corresponding to the high-efficiency short training field sequence is less than 3; and the generated preamble sequence is sent. Therefore, a cycle of a high-efficiency short training sequence in a preamble sequence of a data transmission frame in a WLAN in this embodiment of the disclosure is increased relative to a cycle of the existing HT-STF sequence in IEEE 802.11n or a cycle of the existing VHT-STF sequence in IEEE 802.11ac in the prior art, and further, a maximum cyclic shift delay CSD value that can be used in the WLAN increases accordingly. Further, better AGC performance can be obtained when two stages of automatic gain control AGC adjustment are performed on a received signal in a WLAN system by respectively using an L-STF sequence and a cycle-increased HT-STF sequence or VHT-STF sequence or HE-STF sequence in the preamble sequence.

Figure 13:
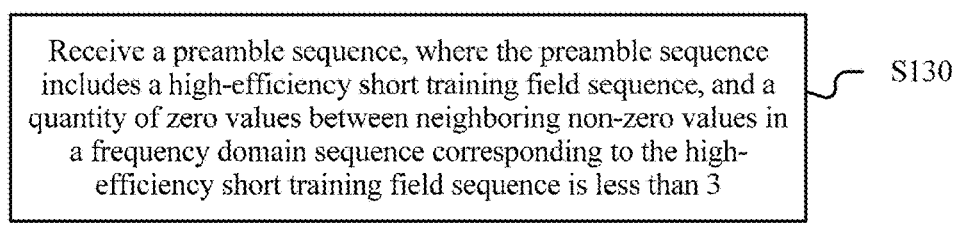
FIG. 13 is a schematic flowchart of an embodiment of a signal receiving method according to the disclosure.

FIG. 13 is a schematic flowchart of an embodiment of a signal receiving method according to the disclosure. The method is corresponding to the signal sending method in FIG. 12. As shown in FIG. 13, the method specifically includes the following step:

Step S130: Receive a preamble sequence, where the preamble sequence includes a high-efficiency short training field sequence, and a quantity of zero values between neighboring non-zero values in a frequency domain sequence corresponding to the high-efficiency short training field sequence is less than 3.

In some feasible implementation manners, non-zero values in the frequency domain sequence in this embodiment are successively 1+1i, −1−1i, 1+1i, −1−1i, −1−1i, 1+1i, −1−1i, −1−1i, 1+1i, 1+1i, 1+1i, and 1+1i.

In some feasible implementation manners, the quantity of zero values between neighboring non-zero values in the frequency domain sequence corresponding to the high-efficiency short training field sequence in this embodiment is 1 or 2.

It may be learned from the foregoing description that, in some feasible implementation manners of the disclosure, a preamble sequence is received, where the preamble sequence includes a high-efficiency short training field sequence (for example, an HT-STF sequence in IEEE 802.11n, or a VHT-STF sequence in IEEE 802.11ac, or an HE-STF in a next-generation WLAN network), and a quantity of zero values between neighboring non-zero values in a frequency domain sequence corresponding to the high-efficiency short training field sequence is less than 3. A cycle of a high-efficiency short training sequence in a preamble sequence of a data transmission frame in a WLAN in this embodiment of the disclosure is increased relative to a cycle of the existing HT-STF sequence in IEEE 802.11n or a cycle of the existing VHT-STF sequence in IEEE 802.11ac in the prior art, and further, a maximum cyclic shift delay CSD value that can be used in the WLAN increases accordingly. Further, better AGC performance can be obtained when two stages of automatic gain control AGC adjustment are performed on a received signal in a WLAN system by respectively using an L-STF sequence and a cycle-increased HT-STF sequence or VHT-STF sequence or HE-STF sequence in the preamble sequence.

Figure 14:
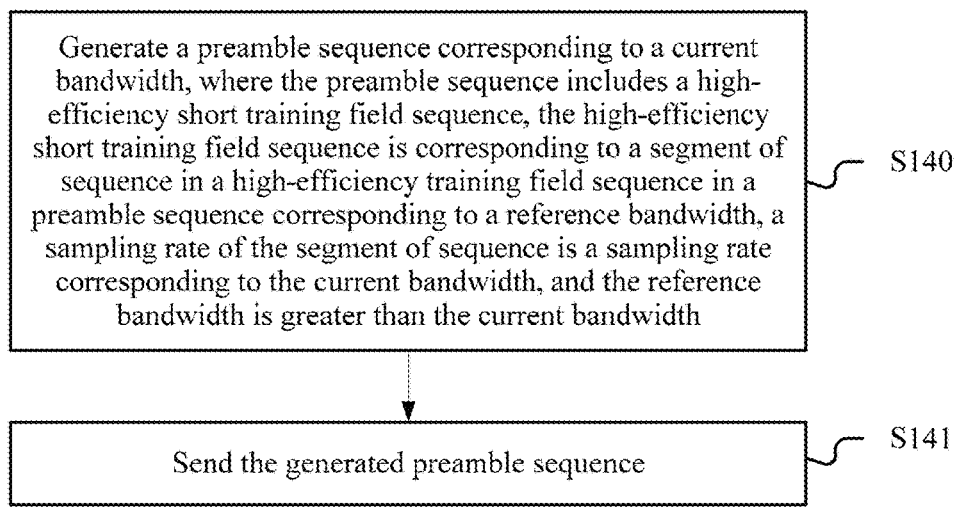
FIG. 14 is a schematic flowchart of another embodiment of a signal sending method according to the disclosure.

FIG. 14 is a schematic flowchart of another embodiment of a signal sending method according to the disclosure. As shown in FIG. 14, the method may include the following steps.

Step S140: Generate a preamble sequence corresponding to a current bandwidth, where the preamble sequence includes a high-efficiency short training field sequence, the high-efficiency short training field sequence is corresponding to a segment of sequence in a high-efficiency training field sequence in a preamble sequence corresponding to a reference bandwidth, a sampling rate of the segment of sequence is a sampling rate corresponding to the current bandwidth, and the reference bandwidth is greater than the current bandwidth.

In specific implementation, the high-efficiency short training field sequence in this embodiment may be a second high-efficiency short training field sequence generated in the method in FIG. 7. In this case, the current bandwidth is corresponding to first bandwidth, and the reference bandwidth is corresponding to a second bandwidth. Certainly, generation or obtaining of the high-efficiency short training sequence in this embodiment is not limited to the method in FIG. 7.

Step S141: Send the generated preamble sequence.

In some feasible implementation manners, the segment of sequence in this embodiment includes at least one cycle.

In some feasible implementation manners, the current bandwidth in this embodiment is 20 MHz, and the high-efficiency short training field sequence included in the preamble sequence corresponding to the current bandwidth has duration of 4 µs, includes 80 sampling points, and is corresponding to a sampling rate of 50 ns;

the reference bandwidth is any one of 40 MHz, 80 MHz, or 160 MHz;

a high-efficiency short training field sequence included in a preamble sequence corresponding to the reference bandwidth of 40 MHz has duration of 4 µs, includes 160 sampling points, and is corresponding to a sampling rate of 25 ns;

a high-efficiency short training field sequence included in a preamble sequence corresponding to the reference bandwidth of 80 MHz has duration of 4 µs, includes 320 sampling points, and is corresponding to a sampling rate of 12.5 ns; and a high-efficiency short training field sequence included in a preamble sequence corresponding to the reference bandwidth of 160 MHz has duration of 4 µs, includes 640 sampling points, and is corresponding to a sampling rate of 6.25 ns.

In some feasible implementation manners, the current bandwidth in this embodiment is 20 MHz, and the high-efficiency short training field sequence included in the preamble sequence corresponding to the current bandwidth has duration of 3.2 µs, includes 64 sampling points, and is corresponding to a sampling rate of 50 ns;

the reference bandwidth is any one of 40 MHz, 80 MHz, or 160 MHz;

a high-efficiency short training field sequence included in a preamble sequence corresponding to the reference bandwidth of 40 MHz has duration of 3.2 µs, includes 128 sampling points, and is corresponding to a sampling rate of 25 ns;

a high-efficiency short training field sequence included in a preamble sequence corresponding to the reference bandwidth of 80 MHz has duration of 3.2 µs, includes 256 sampling points, and is corresponding to a sampling rate of 12.5 ns; and a high-efficiency short training field sequence included in a preamble sequence corresponding to the reference bandwidth of 160 MHz has duration of 43.2 µs, includes 512 sampling points, and is corresponding to a sampling rate of 6.25 ns.

In some feasible implementation manners, the current bandwidth in this embodiment is 40 MHz, and the high-efficiency short training field sequence included in the preamble sequence corresponding to the current bandwidth has duration of 4 µs, includes 160 sampling points, and is corresponding to a sampling rate of 25 ns;

the reference bandwidth is either 80 MHz or 160 MHz;

a high-efficiency short training field sequence included in a preamble sequence corresponding to the reference bandwidth of 80 MHz has duration of 4 µs, includes 320 sampling points, and is corresponding to a sampling rate of 12.5 ns; and a high-efficiency short training field sequence included in a preamble sequence corresponding to the reference bandwidth of 160 MHz has duration of 4 µs, includes 640 sampling points, and is corresponding to a sampling rate of 6.25 ns.

In some feasible implementation manners, the current bandwidth in this embodiment is 40 MHz, and the high-efficiency short training field sequence included in the preamble sequence corresponding to the current bandwidth has duration of 3.2 µs, includes 128 sampling points, and is corresponding to a sampling rate of 25 ns;

the reference bandwidth is either 80 MHz or 160 MHz;

a high-efficiency short training field sequence included in a preamble sequence corresponding to the reference bandwidth of 80 MHz has duration of 3.2 µs, includes 256 sampling points, and is corresponding to a sampling rate of 12.5 ns; and a high-efficiency short training field sequence included in a preamble sequence corresponding to the reference bandwidth of 160 MHz has duration of 43.2 µs, includes 512 sampling points, and is corresponding to a sampling rate of 6.25 ns.

In some feasible implementation manners, the current bandwidth in this embodiment is 80 MHz, and the high-efficiency short training field sequence included in the preamble sequence corresponding to the current bandwidth has duration of 4 µs, includes 320 sampling points, and is corresponding to a sampling rate of 12.5 ns;

the reference bandwidth is 160 MHz; and a high-efficiency short training field sequence included in a preamble sequence corresponding to the reference bandwidth of 160 MHz has duration of 4 µs, includes 640 sampling points, and is corresponding to a sampling rate of 6.25 ns.

In some feasible implementation manners, the current bandwidth in this embodiment is 80 MHz, and the high-efficiency short training field sequence included in the preamble sequence corresponding to the current bandwidth has duration of 3.2 µs, includes 256 sampling points, and is corresponding to a sampling rate of 12.5 ns;

the reference bandwidth is 160 MHz; and a high-efficiency short training field sequence included in a preamble sequence corresponding to the reference bandwidth of 160 MHz has duration of 43.2 µs, includes 512 sampling points, and is corresponding to a sampling rate of 6.25 ns.

It may be learned from the foregoing description that, in some feasible implementation manners of the disclosure, a preamble sequence corresponding to a current bandwidth is generated, where the preamble sequence includes a high-efficiency short training field sequence (for example, an HT-STF sequence in IEEE 802.11n, or a VHT-STF sequence in IEEE 802.11ac, or an HE-STF in a next-generation WLAN network), the high-efficiency short training field sequence is corresponding to a segment of sequence in a high-efficiency training field sequence in a preamble sequence corresponding to a reference bandwidth, a sampling rate of the segment of sequence is a sampling rate corresponding to the current bandwidth, and the reference bandwidth is greater than the current bandwidth; and the generated preamble sequence is sent. Therefore, a cycle of a high-efficiency short training field sequence in the preamble sequence corresponding to the current bandwidth is increased relative to a cycle of the existing HT-STF sequence in IEEE 802.11n or a cycle of the existing VHT-STF sequence in IEEE 802.11ac in the prior art, and further, a maximum cyclic shift delay CSD value that can be used in a WLAN system in the current bandwidth increases accordingly. Further, better AGC performance can be obtained when two stages of automatic gain control AGC adjustment are performed on a received signal in the WLAN system in the current bandwidth by respectively using an L-STF sequence and a cycle-increased HT-STF sequence or VHT-STF sequence or HE-STF sequence in the preamble sequence.

FIG. 15 is a schematic flowchart of another embodiment of a signal receiving method according to the disclosure. The method is corresponding to the signal sending method in FIG. 14. As shown in FIG. 15, the method includes the following step:

Step S150: Receive a preamble sequence corresponding to a current bandwidth, where the preamble sequence includes a high-efficiency short training field sequence, the high-efficiency short training field sequence is corresponding to a segment of sequence in a high-efficiency training field sequence in a preamble sequence corresponding to a reference bandwidth, a sampling rate of the segment of sequence is a sampling rate corresponding to the current bandwidth, and the reference bandwidth is greater than the current bandwidth.

In some feasible implementation manners, the segment of sequence in this embodiment includes at least one cycle.

In some feasible implementation manners, the current bandwidth in this embodiment is 20 MHz, and the high-efficiency short training field sequence included in the preamble sequence corresponding to the current bandwidth has duration of 4 µs, includes 80 sampling points, and is corresponding to a sampling rate of 50 ns;

the reference bandwidth is any one of 40 MHz, 80 MHz, or 160 MHz; a high-efficiency short training field sequence included in a preamble sequence corresponding to the reference bandwidth of 40 MHz has duration of 4 µs, includes 160 sampling points, and is corresponding to a sampling rate of 25 ns;

a high-efficiency short training field sequence included in a preamble sequence corresponding to the reference bandwidth of 80 MHz has duration of 4 µs, includes 320 sampling points, and is corresponding to a sampling rate of 12.5 ns; and a high-efficiency short training field sequence included in a preamble sequence corresponding to the reference bandwidth of 160 MHz has duration of 4 µs, includes 640 sampling points, and is corresponding to a sampling rate of 6.25 ns.

In some feasible implementation manners, the current bandwidth in this embodiment is 20 MHz, and the high-efficiency short training field sequence included in the preamble sequence corresponding to the current bandwidth has duration of 3.2 µs, includes 64 sampling points, and is corresponding to a sampling rate of 50 ns;

the reference bandwidth is any one of 40 MHz, 80 MHz, or 160 MHz;

a high-efficiency short training field sequence included in a preamble sequence corresponding to the reference bandwidth of 40 MHz has duration of 3.2 µs, includes 128 sampling points, and is corresponding to a sampling rate of 25 ns;

a high-efficiency short training field sequence included in a preamble sequence corresponding to the reference bandwidth of 80 MHz has duration of 3.2 µs, includes 256 sampling points, and is corresponding to a sampling rate of 12.5 ns; and a high-efficiency short training field sequence included in a preamble sequence corresponding to the reference bandwidth of 160 MHz has duration of 43.2 µs, includes 512 sampling points, and is corresponding to a sampling rate of 6.25 ns.

In some feasible implementation manners, the current bandwidth in this embodiment is 40 MHz, and the high-efficiency short training field sequence included in the preamble sequence corresponding to the current bandwidth has duration of 4 µs, includes 160 sampling points, and is corresponding to a sampling rate of 25 ns;

the reference bandwidth is either 80 MHz or 160 MHz;

a high-efficiency short training field sequence included in a preamble sequence corresponding to the reference bandwidth of 80 MHz has duration of 4 µs, includes 320 sampling points, and is corresponding to a sampling rate of 12.5 ns; and a high-efficiency short training field sequence included in a preamble sequence corresponding to the reference bandwidth of 160 MHz has duration of 4 µs, includes 640 sampling points, and is corresponding to a sampling rate of 6.25 ns.

In some feasible implementation manners, the current bandwidth in this embodiment is 40 MHz, and the high-efficiency short training field sequence included in the preamble sequence corresponding to the current bandwidth has duration of 3.2 μs, includes 128 sampling points, and is corresponding to a sampling rate of 25 ns;

the reference bandwidth is either 80 MHz or 160 MHz;

a high-efficiency short training field sequence included in a preamble sequence corresponding to the reference bandwidth of 80 MHz has duration of 3.2 μs, includes 256 sampling points, and is corresponding to a sampling rate of 12.5 ns; and a high-efficiency short training field sequence included in a preamble sequence corresponding to the reference bandwidth of 160 MHz has duration of 43.2 μs includes 512 sampling points, and is corresponding to a sampling rate of 6.25 ns.

In some feasible implementation manners, the current bandwidth in this embodiment is 80 MHz, and the high-efficiency short training field sequence included in the preamble sequence corresponding to the current bandwidth has duration of 4 μs, includes 320 sampling points, and is corresponding to a sampling rate of 12.5 ns;

the reference bandwidth is 160 MHz; and a high-efficiency short training field sequence included in a preamble sequence corresponding to the reference bandwidth of 160 MHz has duration of 4 μs, includes 640 sampling points, and is corresponding to a sampling rate of 6.25 ns.

In some feasible implementation manners, the current bandwidth in this embodiment is 80 MHz, and the high-efficiency short training field sequence included in the preamble sequence corresponding to the current bandwidth has duration of 3.2 μs, includes 256 sampling points, and is corresponding to a sampling rate of 12.5 ns;

the reference bandwidth is 160 MHz; and a high-efficiency short training field sequence included in a preamble sequence corresponding to the reference bandwidth of 160 MHz has duration of 43.2 μs, includes 512 sampling points, and is corresponding to a sampling rate of 6.25 ns.

It may be learned from the foregoing description that, in some feasible implementation manners of the disclosure, a preamble sequence corresponding to a current bandwidth is received, where the preamble sequence includes a high-efficiency short training field sequence (for example, an HT-STF sequence in IEEE 802.11n, or a VHT-STF sequence in IEEE 802.11ac, or an HE-STF in a next-generation WLAN network), the high-efficiency short training field sequence is corresponding to a segment of sequence in a high-efficiency training field sequence in a preamble sequence corresponding to a reference bandwidth, a sampling rate of the segment of sequence is a sampling rate corresponding to the current bandwidth, and the reference bandwidth is greater than the current bandwidth. Therefore, a cycle of a high-efficiency short training field sequence in the preamble sequence corresponding to the current bandwidth is increased relative to a cycle of the existing HT-STF sequence in IEEE 802.11n or a cycle of the existing VHT-STF sequence in IEEE 802.11ac in the prior art, and further, a maximum cyclic shift delay CSD value that can be used in a WLAN system in the current bandwidth increases accordingly. Further, better AGC performance can be obtained when two stages of automatic gain control AGC adjustment are performed on a received signal in the WLAN system in the current bandwidth by respectively using an L-STF sequence and a cycle-increased HT-STF sequence or VHT-STF sequence or HE-STF sequence in the preamble sequence.

Figure 16:
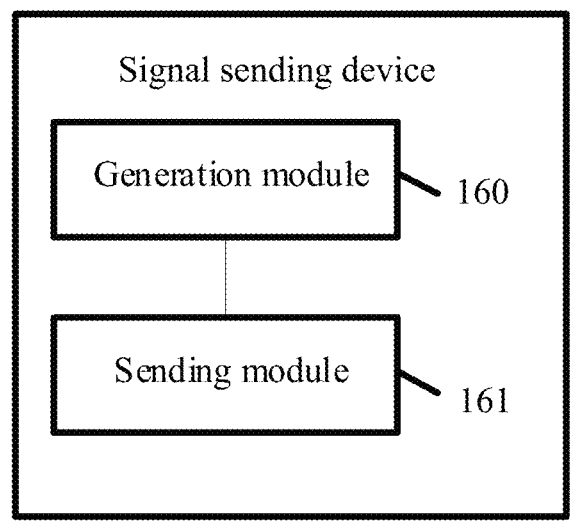
FIG. 16 is a schematic diagram of structural composition of an embodiment of a signal sending device according to the disclosure.

FIG. 16 is a schematic diagram of structural composition of an embodiment of a signal sending device according to the disclosure. The device may be configured to implement the signal sending method in FIG. 12. As shown in FIG. 16, the device may include a generation module 160 and a sending module 161.

The generation module 160 is configured to generate a preamble sequence, where the preamble sequence includes a high-efficiency short training field sequence, and a quantity of zero values between neighboring non-zero values in a frequency domain sequence corresponding to the high-efficiency short training field sequence is less than 3.

The sending module 161 is configured to send the generated preamble sequence.

In specific implementation, the high-efficiency short training field sequence in this embodiment may be a second high-efficiency short training field sequence generated in the foregoing method shown in FIG. 6. Certainly, alternatively, the high-efficiency short training field sequence in this embodiment may be generated or obtained in another manner.

In some feasible implementation manners, non-zero values in the frequency domain sequence in this embodiment are successively 1+1i, −1−1i, 1+1i, −1−1i, −1−1i, 1+1i, −1−1i, −1−1i, 1+1i, 1+1i, 1+1i, and 1+1i. A complete sequence of the frequency domain sequence is the foregoing sequence 1.

In some feasible implementation manners, the quantity of zero values between neighboring non-zero values in the frequency domain sequence corresponding to the high-efficiency short training field sequence is 1 or 2. For example, a sequence in which a quantity of zero values between non-zero values is 1 may be the foregoing sequence 2, and a sequence in which a quantity of zero values between non-zero values is 1 may be the foregoing sequence 3.

It may be learned from the foregoing description that, in some feasible implementation manners of the disclosure, a preamble sequence is generated, where the preamble sequence includes a high-efficiency short training field sequence (for example, an HT-STF sequence in IEEE 802.11n, or a VHT-STF sequence in IEEE 802.11ac, or an HE-STF in a next-generation WLAN network), and a quantity of zero values between neighboring non-zero values in a frequency domain sequence corresponding to the high-efficiency short training field sequence is less than 3; and the generated preamble sequence is sent. Therefore, a cycle of a high-efficiency short training sequence in a preamble sequence of a data transmission frame in a WLAN in this embodiment of the disclosure is increased relative to a cycle of the existing HT-STF sequence in IEEE 802.11n or a cycle of the existing VHT-STF sequence in IEEE 802.11ac in the prior art, and further, a maximum cyclic shift delay CSD value that can be used in the WLAN increases accordingly. Further, better AGC performance can be obtained when two stages of automatic gain control AGC adjustment are performed on a received signal in a WLAN system by respectively using an L-STF sequence and a cycle-increased HT-STF sequence or VHT-STF sequence or HE-STF sequence in the preamble sequence.

Figure 17:
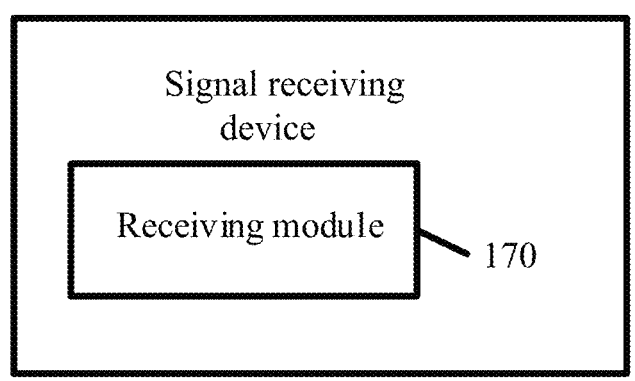
FIG. 17 is a schematic diagram of structural composition of an embodiment of a signal receiving device according to the disclosure.

FIG. 17 is a schematic diagram of structural composition of an embodiment of a signal receiving device according to the disclosure. The device may be configured to implement the signal receiving method in FIG. 13. As shown in FIG. 17, the device may include:

a receiving module 170, configured to receive a preamble sequence, where the preamble sequence includes a high-efficiency short training field sequence, and a quantity of zero values between neighboring non-zero values in a frequency domain sequence corresponding to the high-efficiency short training field sequence is less than 3.

In some feasible implementation manners, non-zero values in the frequency domain sequence in this embodiment are successively 1+1i, −1−1i, 1+1i, −1−1i, −1−1i, 1+1i, −1−1i, −1−1i, 1+1i, 1+1i, 1+1i, and 1+1i. A complete sequence of the frequency domain sequence is the foregoing sequence 1.

In some feasible implementation manners, the quantity of zero values between neighboring non-zero values in the frequency domain sequence corresponding to the high-efficiency short training field sequence is 1 or 2. For example, a sequence in which a quantity of zero values between non-zero values is 1 may be the foregoing sequence 2, and a sequence in which a quantity of zero values between non-zero values is 1 may be the foregoing sequence 3.

It may be learned from the foregoing description that, in some feasible implementation manners of the disclosure, a preamble sequence is received, where the preamble sequence includes a high-efficiency short training field sequence (for example, an HT-STF sequence in IEEE 802.11n, or a VHT-STF sequence in IEEE 802.11ac, or an HE-STF in a next-generation WLAN network), and a quantity of zero values between neighboring non-zero values in a frequency domain sequence corresponding to the high-efficiency short training field sequence is less than 3. A cycle of a high-efficiency short training sequence in a preamble sequence of a data transmission frame in a WLAN in this embodiment of the disclosure is increased relative to a cycle of the existing HT-STF sequence in IEEE 802.11n or a cycle of the existing VHT-STF sequence in IEEE 802.11ac in the prior art, and further, a maximum cyclic shift delay CSD value that can be used in the WLAN increases accordingly. Further, better AGC performance can be obtained when two stages of automatic gain control AGC adjustment are performed on a received signal in a WLAN system by respectively using an L-STF sequence and a cycle-increased HT-STF sequence or VHT-STF sequence or HE-STF sequence in the preamble sequence.

Figure 18:
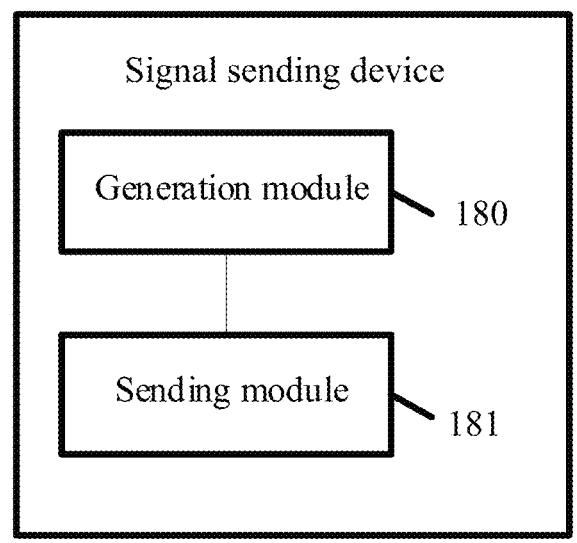
FIG. 18 is a schematic diagram of structural composition of another embodiment of a signal sending device according to the disclosure.

FIG. 18 is a schematic diagram of structural composition of another embodiment of a signal sending device according to the disclosure. The device may be configured to implement the foregoing signal sending method in FIG. 14. As shown in FIG. 18, the device may include a generation module 180 and a sending module 181.

The generation module 180 is configured to generate a preamble sequence corresponding to a current bandwidth, where the preamble sequence includes a high-efficiency short training field sequence, the high-efficiency short training field sequence is corresponding to a segment of sequence in a high-efficiency training field sequence in a preamble sequence corresponding to a reference bandwidth, a sampling rate of the segment of sequence is a sampling rate corresponding to the current bandwidth, and the reference bandwidth is greater than the current bandwidth.

The sending module 181 is configured to send the generated preamble sequence.

In specific implementation, the high-efficiency short training field sequence in this embodiment may be a second high-efficiency short training field sequence generated in the method in FIG. 7. In this case, the current bandwidth is corresponding to first bandwidth, and the reference bandwidth is corresponding to a second bandwidth. Certainly, generation or obtaining of the high-efficiency short training sequence in this embodiment is not limited to the method in FIG. 7.

In some feasible implementation manners, the segment of sequence in this embodiment includes at least one cycle.

In some feasible implementation manners, the current bandwidth in this embodiment is 20 MHz, and the high-efficiency short training field sequence included in the preamble sequence corresponding to the current bandwidth has duration of 4 μs, includes 80 sampling points, and is corresponding to a sampling rate of 50 ns;

the reference bandwidth is any one of 40 MHz, 80 MHz, or 160 MHz;

a high-efficiency short training field sequence included in a preamble sequence corresponding to the reference bandwidth of 40 MHz has duration of 4 μs, includes 160 sampling points, and is corresponding to a sampling rate of 25 ns;

a high-efficiency short training field sequence included in a preamble sequence corresponding to the reference bandwidth of 80 MHz has duration of 4 μs, includes 320 sampling points, and is corresponding to a sampling rate of 12.5 ns; and a high-efficiency short training field sequence included in a preamble sequence corresponding to the reference bandwidth of 160 MHz has duration of 4 μs, includes 640 sampling points, and is corresponding to a sampling rate of 6.25 ns.

In some feasible implementation manners, the current bandwidth in this embodiment is 20 MHz, and the high-efficiency short training field sequence included in the preamble sequence corresponding to the current bandwidth has duration of 3.2 μs, includes 64 sampling points, and is corresponding to a sampling rate of 50 ns;

the reference bandwidth is any one of 40 MHz, 80 MHz, or 160 MHz;

a high-efficiency short training field sequence included in a preamble sequence corresponding to the reference bandwidth of 40 MHz has duration of 3.2 μs, includes 128 sampling points, and is corresponding to a sampling rate of 25 ns;

a high-efficiency short training field sequence included in a preamble sequence corresponding to the reference bandwidth of 80 MHz has duration of 3.2 μs, includes 256 sampling points, and is corresponding to a sampling rate of 12.5 ns; and a high-efficiency short training field sequence included in a preamble sequence corresponding to the reference bandwidth of 160 MHz has duration of 43.2 μs, includes 512 sampling points, and is corresponding to a sampling rate of 6.25 ns.

In some feasible implementation manners, the current bandwidth in this embodiment is 40 MHz, and the high-efficiency short training field sequence included in the preamble sequence corresponding to the current bandwidth has duration of 4 μs, includes 160 sampling points, and is corresponding to a sampling rate of 25 ns;

the reference bandwidth is either 80 MHz or 160 MHz;

a high-efficiency short training field sequence included in a preamble sequence corresponding to the reference bandwidth of 80 MHz has duration of 4 μs, includes 320 sampling points, and is corresponding to a sampling rate of 12.5 ns; and a high-efficiency short training field sequence included in a preamble sequence corresponding to the reference bandwidth of 160 MHz has duration of 4 μs, includes 640 sampling points, and is corresponding to a sampling rate of 6.25 ns.

In some feasible implementation manners, the current bandwidth in this embodiment is 40 MHz, and the high-efficiency short training field sequence included in the preamble sequence corresponding to the current bandwidth has duration of 3.2 μs, includes 128 sampling points, and is corresponding to a sampling rate of 25 ns;

the reference bandwidth is either 80 MHz or 160 MHz;

a high-efficiency short training field sequence included in a preamble sequence corresponding to the reference bandwidth of 80 MHz has duration of 3.2 μs, includes 256 sampling points, and is corresponding to a sampling rate of 12.5 ns; and a high-efficiency short training field sequence included in a preamble sequence corresponding to the reference bandwidth of 160 MHz has duration of 43.2 μs, includes 512 sampling points, and is corresponding to a sampling rate of 6.25 ns.

In some feasible implementation manners, the current bandwidth in this embodiment is 80 MHz, and the high-efficiency short training field sequence included in the preamble sequence corresponding to the current bandwidth has duration of 4 μs, includes 320 sampling points, and is corresponding to a sampling rate of 12.5 ns;

the reference bandwidth is 160 MHz; and a high-efficiency short training field sequence included in a preamble sequence corresponding to the reference bandwidth of 160 MHz has duration of 4 μs, includes 640 sampling points, and is corresponding to a sampling rate of 6.25 ns.

In some feasible implementation manners, the current bandwidth in this embodiment is 80 MHz, and the high-efficiency short training field sequence included in the preamble sequence corresponding to the current bandwidth has duration of 3.2 μs, includes 256 sampling points, and is corresponding to a sampling rate of 12.5 ns;

the reference bandwidth is 160 MHz; and a high-efficiency short training field sequence included in a preamble sequence corresponding to the reference bandwidth of 160 MHz has duration of 43.2 μs, includes 512 sampling points, and is corresponding to a sampling rate of 6.25 ns.

It may be learned from the foregoing description that, in some feasible implementation manners of the disclosure, a preamble sequence corresponding to a current bandwidth is generated, where the preamble sequence includes a high-efficiency short training field sequence (for example, an HT-STF sequence in IEEE 802.11n, or a VHT-STF sequence in IEEE 802.11ac, or an HE-STF in a next-generation WLAN network), the high-efficiency short training field sequence is corresponding to a segment of sequence in a high-efficiency training field sequence in a preamble sequence corresponding to a reference bandwidth, a sampling rate of the segment of sequence is a sampling rate corresponding to the current bandwidth, and the reference bandwidth is greater than the current bandwidth; and the generated preamble sequence is sent. Therefore, a cycle of a high-efficiency short training field sequence in the preamble sequence corresponding to the current bandwidth is increased relative to a cycle of the existing HT-STF sequence in IEEE 802.11n or a cycle of the existing VHT-STF sequence in IEEE 802.11ac in the prior art, and further, a maximum cyclic shift delay CSD value that can be used in a WLAN system in the current bandwidth increases accordingly. Further, better AGC performance can be obtained when two stages of automatic gain control AGC adjustment are performed on a received signal in the WLAN system in the current bandwidth by respectively using an L-STF sequence and a cycle-increased HT-STF sequence or VHT-STF sequence or HE-STF sequence in the preamble sequence.

Figure 19:
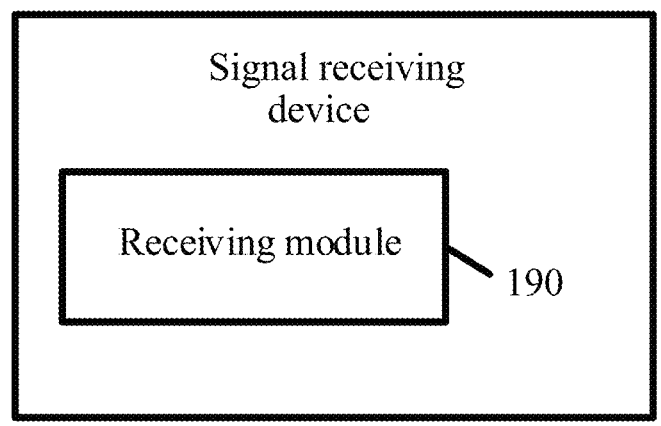
FIG. 19 is a schematic diagram of structural composition of another embodiment of a signal receiving device according to the disclosure.

FIG. 19 is a schematic diagram of structural composition of another embodiment of a signal receiving device according to the disclosure. The device may be configured to implement the signal receiving method in FIG. 15. As shown in FIG. 19, the device may include:

a receiving module 190, configured to receive a preamble sequence corresponding to a current bandwidth, where the preamble sequence includes a high-efficiency short training field sequence, the high-efficiency short training field sequence is corresponding to a segment of sequence in a high-efficiency training field sequence in a preamble sequence corresponding to a reference bandwidth, a sampling rate of the segment of sequence is a sampling rate corresponding to the current bandwidth, and the reference bandwidth is greater than the current bandwidth.

In some feasible implementation manners, the segment of sequence in this embodiment includes at least one cycle.

In some feasible implementation manners, the current bandwidth in this embodiment is 20 MHz, and the high-efficiency short training field sequence included in the preamble sequence corresponding to the current bandwidth has duration of 4 μs, includes 80 sampling points, and is corresponding to a sampling rate of 50 ns;

the reference bandwidth is any one of 40 MHz, 80 MHz, or 160 MHz;

a high-efficiency short training field sequence included in a preamble sequence corresponding to the reference bandwidth of 40 MHz has duration of 4 μs, includes 160 sampling points, and is corresponding to a sampling rate of 25 ns;

a high-efficiency short training field sequence included in a preamble sequence corresponding to the reference bandwidth of 80 MHz has duration of 4 μs, includes 320 sampling points, and is corresponding to a sampling rate of 12.5 ns; and a high-efficiency short training field sequence included in a preamble sequence corresponding to the reference bandwidth of 160 MHz has duration of 4 μs, includes 640 sampling points, and is corresponding to a sampling rate of 6.25 ns.

In some feasible implementation manners, the current bandwidth in this embodiment is 20 MHz, and the high-efficiency short training field sequence included in the preamble sequence corresponding to the current bandwidth has duration of 3.2 μs, includes 64 sampling points, and is corresponding to a sampling rate of 50 ns;

the reference bandwidth is any one of 40 MHz, 80 MHz, or 160 MHz;

a high-efficiency short training field sequence included in a preamble sequence corresponding to the reference bandwidth of 40 MHz has duration of 3.2 μs, includes 128 sampling points, and is corresponding to a sampling rate of 25 ns;

a high-efficiency short training field sequence included in a preamble sequence corresponding to the reference bandwidth of 80 MHz has duration of 3.2 μs, includes 256 sampling points, and is corresponding to a sampling rate of 12.5 ns; and a high-efficiency short training field sequence included in a preamble sequence corresponding to the reference bandwidth of 160 MHz has duration of 43.2 μs, includes 512 sampling points, and is corresponding to a sampling rate of 6.25 ns.

In some feasible implementation manners, the current bandwidth in this embodiment is 40 MHz, and the high-efficiency short training field sequence included in the preamble sequence corresponding to the current bandwidth has duration of 4 µs, includes 160 sampling points, and is corresponding to a sampling rate of 25 ns;

the reference bandwidth is either 80 MHz or 160 MHz;

a high-efficiency short training field sequence included in a preamble sequence corresponding to the reference bandwidth of 80 MHz has duration of 4 µs, includes 320 sampling points, and is corresponding to a sampling rate of 12.5 ns; and a high-efficiency short training field sequence included in a preamble sequence corresponding to the reference bandwidth of 160 MHz has duration of 4 µs, includes 640 sampling points, and is corresponding to a sampling rate of 6.25 ns.

In some feasible implementation manners, the current bandwidth in this embodiment is 40 MHz, and the high-efficiency short training field sequence included in the preamble sequence corresponding to the current bandwidth has duration of 3.2 µs, includes 128 sampling points, and is corresponding to a sampling rate of 25 ns;

the reference bandwidth is either 80 MHz or 160 MHz;

a high-efficiency short training field sequence included in a preamble sequence corresponding to the reference bandwidth of 80 MHz has duration of 3.2 µs, includes 256 sampling points, and is corresponding to a sampling rate of 12.5 ns; and a high-efficiency short training field sequence included in a preamble sequence corresponding to the reference bandwidth of 160 MHz has duration of 43.2 µs, includes 512 sampling points, and is corresponding to a sampling rate of 6.25 ns.

In some feasible implementation manners, the current bandwidth in this embodiment is 80 MHz, and the high-efficiency short training field sequence included in the preamble sequence corresponding to the current bandwidth has duration of 4 µs, includes 320 sampling points, and is corresponding to a sampling rate of 12.5 ns;

the reference bandwidth is 160 MHz; and a high-efficiency short training field sequence included in a preamble sequence corresponding to the reference bandwidth of 160 MHz has duration of 4 µs, includes 640 sampling points, and is corresponding to a sampling rate of 6.25 ns.

In some feasible implementation manners, the current bandwidth in this embodiment is 80 MHz, and the high-efficiency short training field sequence included in the preamble sequence corresponding to the current bandwidth has duration of 3.2 µs, includes 256 sampling points, and is corresponding to a sampling rate of 12.5 ns;

the reference bandwidth is 160 MHz; and a high-efficiency short training field sequence included in a preamble sequence corresponding to the reference bandwidth of 160 MHz has duration of 43.2 µs, includes 512 sampling points, and is corresponding to a sampling rate of 6.25 ns.

It may be learned from the foregoing description that, in some feasible implementation manners of the disclosure, a preamble sequence corresponding to a current bandwidth is received, where the preamble sequence includes a high-efficiency short training field sequence (for example, an HT-STF sequence in IEEE 802.11n, or a VHT-STF sequence in IEEE 802.11ac, or an HE-STF in a next-generation WLAN network), the high-efficiency short training field sequence is corresponding to a segment of sequence in a high-efficiency training field sequence in a preamble sequence corresponding to a reference bandwidth, a sampling rate of the segment of sequence is a sampling rate corresponding to the current bandwidth, and the reference bandwidth is greater than the current bandwidth. Therefore, a cycle of a high-efficiency short training field sequence in the preamble sequence corresponding to the current bandwidth is increased relative to a cycle of the existing HT-STF sequence in IEEE 802.11n or a cycle of the existing VHT-STF sequence in IEEE 802.11ac in the prior art, and further, a maximum cyclic shift delay CSD value that can be used in a WLAN system in the current bandwidth increases accordingly. Further, better AGC performance can be obtained when two stages of automatic gain control AGC adjustment are performed on a received signal in the WLAN system in the current bandwidth by respectively using an L-STF sequence and a cycle-increased HT-STF sequence or VHT-STF sequence or HE-STF sequence in the preamble sequence.

Figure 20:
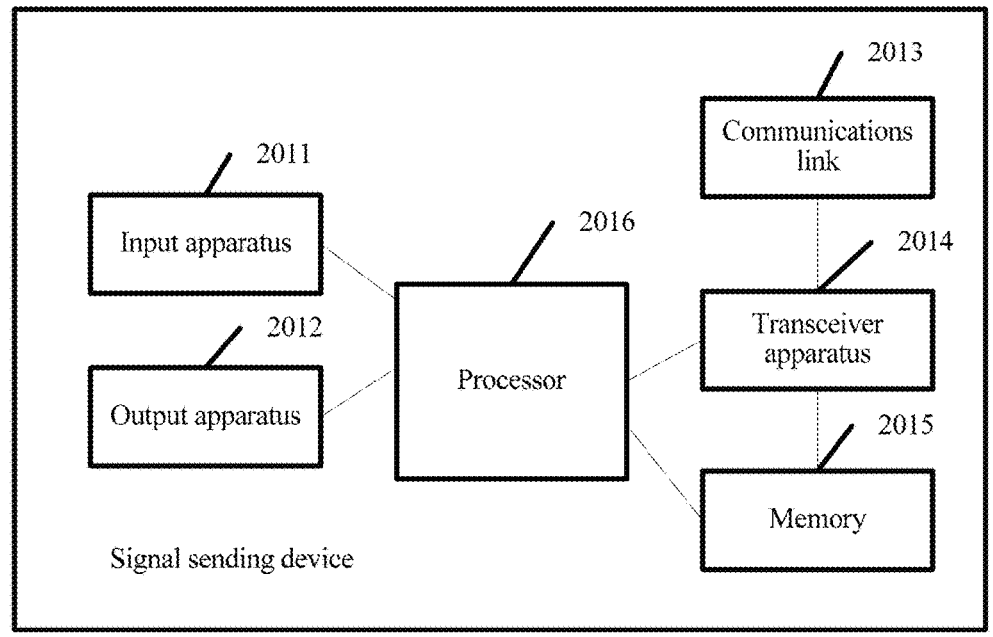
FIG. 20 is a schematic diagram of structural composition of another embodiment of a signal sending device according to the disclosure.

FIG. 20 is a schematic diagram of structural composition of another embodiment of a signal sending device according to the disclosure. The device may be configured to implement the signal sending method in FIG. 12. As shown in FIG. 20, the device includes an input apparatus 2011, an output apparatus 2012, a communication link 2013, a transceiver apparatus 2014, a memory 2015, and a processor 2016.

The input apparatus 2011 is configured to receive input data that is input into the signal sending device from the outside.

In specific implementation, the input apparatus 2011 in this embodiment of the disclosure may include a keyboard, a mouse, a photoelectronic input apparatus, a voice input apparatus, a touch-based input apparatus, a scanner, and the like.

The output apparatus 2012 is configured to output output data of the signal sending device to the outside. In specific implementation, the output apparatus 2012 in this embodiment of the disclosure may include a display, a loudspeaker, a printer, and the like.

The communication link 2013 is configured to establish a communication connection between the signal sending device and another device. In specific implementation, the communication link 2013 in this embodiment of the disclosure may be an instance of a propagation medium. The propagation medium may generally substantialize a computer readable instruction, a data structure, a program module, or other data in a form of another modulation data signal (such as a carrier or another transport mechanism). For example, the propagation medium may include a wired media such as a wired network or a direct-wired connection. Alternatively, the propagation medium may include a wired medium such as a sound wave, a radio frequency, or an infrared ray.

The transceiver apparatus 2014 is configured to communicate with the another device by using the communication link 2013, for example, transmitting and receiving data. In specific implementation, the transceiver apparatus 2014 may be an antenna or another transceiver apparatus.

The memory 2015 is configured to store program data with various functions. In specific implementation, the memory 2015 in this embodiment of the disclosure may be a system memory such as a volatile memory (such as a RAM), a non-volatile memory (such as a ROM and a flash memory), or a combination of a volatile memory and a non-volatile memory. In specific implementation, alternatively, the memory 2015 in this embodiment of the disclosure may be an external memory outside a system, such as a magnetic disk, a disc, or a magnetic tape.

The processor 2016 is configured to call the program data stored in the memory 2015 to execute the following operations:

generating a preamble sequence, where the preamble sequence includes a high-efficiency short training field sequence, and a quantity of zero values between neighboring non-zero values in a frequency domain sequence corresponding to the high-efficiency short training field sequence is less than 3; and sending the generated preamble sequence to the transceiver apparatus 2014 for sending.

In some feasible implementation manners, non-zero values in the frequency domain sequence in this embodiment are successively 1+1i, −1−1i, 1+1i, −1−1i, −1−1i, 1+1i, −1−1i, −1−1i, 1+1i, and 1+1i, 1+1i, and 1+1i.

In some feasible implementation manners, the quantity of zero values between neighboring non-zero values in the frequency domain sequence corresponding to the high-efficiency short training field sequence in this embodiment is 1 or 2.

Figure 21:
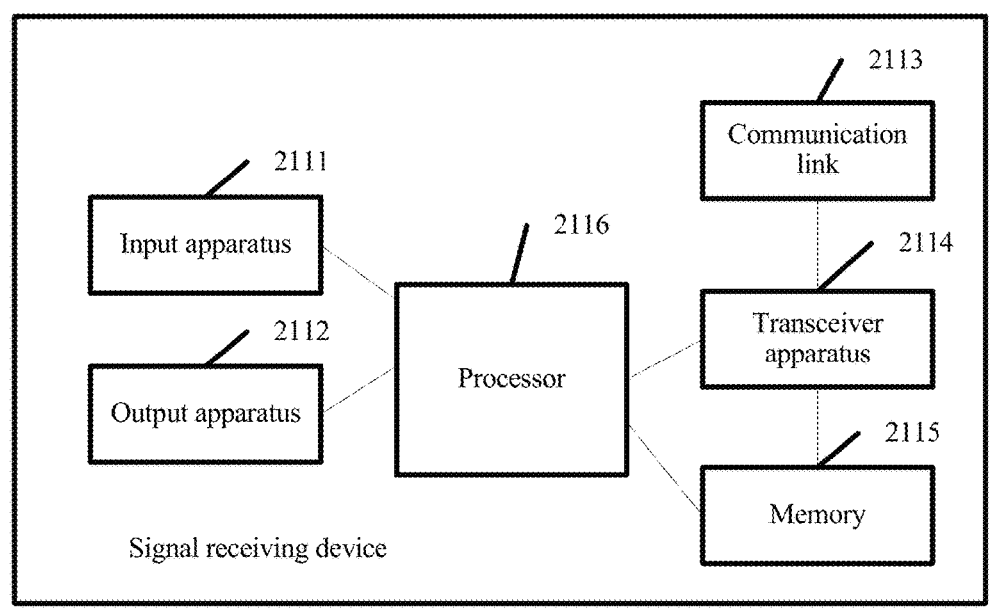
FIG. 21 is a schematic diagram of structural composition of another embodiment of a signal receiving device according to the disclosure.

FIG. 21 is a schematic diagram of structural composition of another embodiment of a signal receiving device according to the disclosure. The device may be configured to implement the signal receiving method in FIG. 13. As shown in FIG. 21, the device may include an input apparatus 2111, an output apparatus 2112, a communication link 2113, a transceiver apparatus 2114, a memory 2115, and a processor 2116.

The input apparatus 2111 is configured to receive input data that is input into the signal receiving device from the outside. In specific implementation, the input apparatus 2111 in this embodiment of the disclosure may include a keyboard, a mouse, a photoelectronic input apparatus, a voice input apparatus, a touch-based input apparatus, a scanner, and the like.

The output apparatus 2112 is configured to output output data of the signal receiving device to the outside. In specific implementation, the output apparatus 2112 in this embodiment of the disclosure may include a display, a loudspeaker, a printer, and the like.

The communication link 2113 is configured to establish a communication connection between the signal receiving device and another device. In specific implementation, the communication link 2113 in this embodiment of the disclosure may be an instance of a propagation medium. The propagation medium may generally substantialize a computer readable instruction, a data structure, a program module, or other data in a form of another modulation data signal (such as a carrier or another transport mechanism). For example, the propagation medium may include a wired media such as a wired network or a direct-wired connection. Alternatively, the propagation medium may include a wired medium such as a sound wave, a radio frequency, or an infrared ray.

The transceiver apparatus 2114 is configured to communicate with the another device by using the communication link 2113, for example, transmitting and receiving data. In specific implementation, the transceiver apparatus 2114 may be an antenna or another transceiver apparatus. A preamble sequence received by the transceiver apparatus 2114 in this embodiment includes a high-efficiency short training field sequence, and a quantity of zero values between neighboring non-zero values in a frequency domain sequence corresponding to the high-efficiency short training field sequence is less than 3.

The memory 2115 is configured to store program data with various functions. In specific implementation, the memory 2115 in this embodiment of the disclosure may be a system memory such as a volatile memory (such as a RAM), a non-volatile memory (such as a ROM and a flash memory), or a combination of a volatile memory and a non-volatile memory. In specific implementation, alternatively, the memory 2115 in this embodiment of the disclosure may be an external memory outside a system, such as a magnetic disk, a disc, or a magnetic tape.

The processor 2116 is configured to call the program data stored in the memory 2115 to execute the following operation:

receiving the preamble sequence from the transceiver apparatus 2114.

In some feasible implementation manners, non-zero values in the frequency domain sequence in this embodiment are successively 1+1i, −1−1i, 1+1i, −1−1i, −1−1i, 1+1i, −1−1i, −1−1i, 1+1i, 1+1i, 1+1i, and 1+1i.

In some feasible implementation manners, the quantity of zero values between neighboring non-zero values in the frequency domain sequence corresponding to the high-efficiency short training field sequence in this embodiment is 1 or 2.

Figure 22:
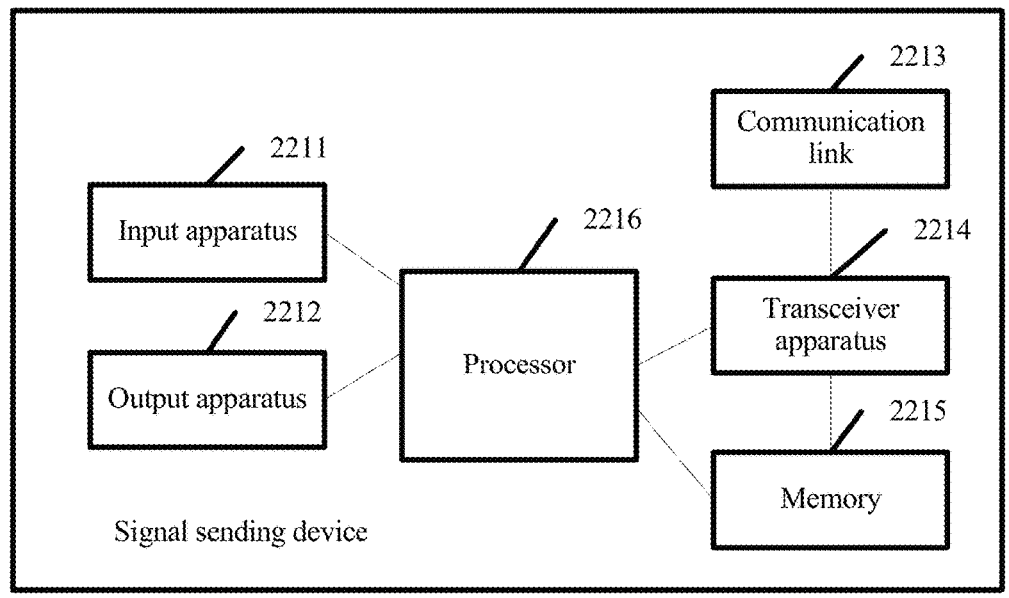
FIG. 22 is a schematic diagram of structural composition of another embodiment of a signal sending device according to the disclosure.

FIG. 22 is a schematic diagram of structural composition of another embodiment of a signal sending device according to the disclosure. The device may be configured to implement the signal sending method in FIG. 14. As shown in FIG. 22, the device may include an input apparatus 2211, an output apparatus 2212, a communication link 2213, a transceiver apparatus 2214, a memory 2215, and a processor 2216.

The input apparatus 2211 is configured to receive input data that is input into the signal sending device from the outside. In specific implementation, the input apparatus 2211 in this embodiment of the disclosure may include a keyboard, a mouse, a photoelectronic input apparatus, a voice input apparatus, a touch-based input apparatus, a scanner, and the like.

The output apparatus 2212 is configured to output output data of the signal sending device to the outside. In specific implementation, the output apparatus 2212 in this embodiment of the disclosure may include a display, a loudspeaker, a printer, and the like.

The communication link 2213 is configured to establish a communication connection between the signal sending device and another device. In specific implementation, the communication link 2213 in this embodiment of the disclosure may be an instance of a propagation medium. The propagation medium may generally substantialize a computer readable instruction, a data structure, a program module, or other data in a form of another modulation data signal (such as a carrier or another transport mechanism). For example, the propagation medium may include a wired media such as a wired network or a direct-wired connection. Alternatively, the propagation medium may include a wired medium such as a sound wave, a radio frequency, or an infrared ray.

The transceiver apparatus 2214 is configured to communicate with the another device by using the communication link 2213, for example, transmitting and receiving data. In specific implementation, the transceiver apparatus 2214 may be an antenna or another transceiver apparatus. A preamble sequence received by the transceiver apparatus 2214 in this embodiment includes a high-efficiency short training field sequence, and a quantity of zero values between neighboring non-zero values in a frequency domain sequence corresponding to the high-efficiency short training field sequence is less than 3.

The memory 2215 is configured to store program data with various functions. In specific implementation, the memory 2215 in this embodiment of the disclosure may be a system memory such as a volatile memory (such as a RAM), a non-volatile memory (such as a ROM and a flash memory), or a combination of a volatile memory and a non-volatile memory. In specific implementation, alternatively, the memory 2215 in this embodiment of the disclosure may be an external memory outside a system, such as a magnetic disk, a disc, or a magnetic tape.

The processor 2216 is configured to call the program data stored in the memory 2215 to execute the following operations:

generating a preamble sequence corresponding to a current bandwidth, where the preamble sequence includes a high-efficiency short training field sequence, the high-efficiency short training field sequence is corresponding to a segment of sequence in a high-efficiency training field sequence in a preamble sequence corresponding to a reference bandwidth, a sampling rate of the segment of sequence is a sampling rate corresponding to the current bandwidth, and the reference bandwidth is greater than the current bandwidth; and sending the generated preamble sequence to the transceiver apparatus for sending.

In some feasible implementation manners, the segment of sequence in this embodiment includes at least one cycle.

In some feasible implementation manners, the current bandwidth in this embodiment is 20 MHz, and the high-efficiency short training field sequence included in the preamble sequence corresponding to the current bandwidth has duration of 4 μs, includes 80 sampling points, and is corresponding to a sampling rate of 50 ns;

the reference bandwidth is any one of 40 MHz, 80 MHz, or 160 MHz;

a high-efficiency short training field sequence included in a preamble sequence corresponding to the reference bandwidth of 40 MHz has duration of 4 μs, includes 160 sampling points, and is corresponding to a sampling rate of 25 ns;

a high-efficiency short training field sequence included in a preamble sequence corresponding to the reference bandwidth of 80 MHz has duration of 4 μs, includes 320 sampling points, and is corresponding to a sampling rate of 12.5 ns; and a high-efficiency short training field sequence included in a preamble sequence corresponding to the reference bandwidth of 160 MHz has duration of 4 μs, includes 640 sampling points, and is corresponding to a sampling rate of 6.25 ns.

In some feasible implementation manners, the current bandwidth in this embodiment is 20 MHz, and the high-efficiency short training field sequence included in the preamble sequence corresponding to the current bandwidth has duration of 3.2 μs, includes 64 sampling points, and is corresponding to a sampling rate of 50 ns;

the reference bandwidth is any one of 40 MHz, 80 MHz, or 160 MHz;

a high-efficiency short training field sequence included in a preamble sequence corresponding to the reference bandwidth of 40 MHz has duration of 3.2 μs, includes 128 sampling points, and is corresponding to a sampling rate of 25 ns;

a high-efficiency short training field sequence included in a preamble sequence corresponding to the reference bandwidth of 80 MHz has duration of 3.2 μs, includes 256 sampling points, and is corresponding to a sampling rate of 12.5 ns; and a high-efficiency short training field sequence included in a preamble sequence corresponding to the reference bandwidth of 160 MHz has duration of 43.2 μs, includes 512 sampling points, and is corresponding to a sampling rate of 6.25 ns.

In some feasible implementation manners, the current bandwidth in this embodiment is 40 MHz, and the high-efficiency short training field sequence included in the preamble sequence corresponding to the current bandwidth has duration of 4 μs, includes 160 sampling points, and is corresponding to a sampling rate of 25 ns;

the reference bandwidth is either 80 MHz or 160 MHz;

a high-efficiency short training field sequence included in a preamble sequence corresponding to the reference bandwidth of 80 MHz has duration of 4 μs, includes 320 sampling points, and is corresponding to a sampling rate of 12.5 ns; and a high-efficiency short training field sequence included in a preamble sequence corresponding to the reference bandwidth of 160 MHz has duration of 4 μs, includes 640 sampling points, and is corresponding to a sampling rate of 6.25 ns.

In some feasible implementation manners, the current bandwidth in this embodiment is 40 MHz, and the high-efficiency short training field sequence included in the preamble sequence corresponding to the current bandwidth has duration of 3.2 μs, includes 128 sampling points, and is corresponding to a sampling rate of 25 ns;

the reference bandwidth is either 80 MHz or 160 MHz;

a high-efficiency short training field sequence included in a preamble sequence corresponding to the reference bandwidth of 80 MHz has duration of 3.2 μs, includes 256 sampling points, and is corresponding to a sampling rate of 12.5 ns; and a high-efficiency short training field sequence included in a preamble sequence corresponding to the reference bandwidth of 160 MHz has duration of 43.2 μs, includes 512 sampling points, and is corresponding to a sampling rate of 6.25 ns.

In some feasible implementation manners, the current bandwidth in this embodiment is 80 MHz, and the high-efficiency short training field sequence included in the preamble sequence corresponding to the current bandwidth has duration of 4 μs, includes 320 sampling points, and is corresponding to a sampling rate of 12.5 ns;

the reference bandwidth is 160 MHz; and a high-efficiency short training field sequence included in a preamble sequence corresponding to the reference bandwidth of 160 MHz has duration of 4 μs, includes 640 sampling points, and is corresponding to a sampling rate of 6.25 ns.

In some feasible implementation manners, the current bandwidth in this embodiment is 80 MHz, and the high-efficiency short training field sequence included in the preamble sequence corresponding to the current bandwidth has duration of 3.2 μs, includes 256 sampling points, and is corresponding to a sampling rate of 12.5 ns;

the reference bandwidth is 160 MHz; and a high-efficiency short training field sequence included in a preamble sequence corresponding to the reference bandwidth of 160 MHz has duration of 43.2 μs, includes 512 sampling points, and is corresponding to a sampling rate of 6.25 ns.

Figure 23:
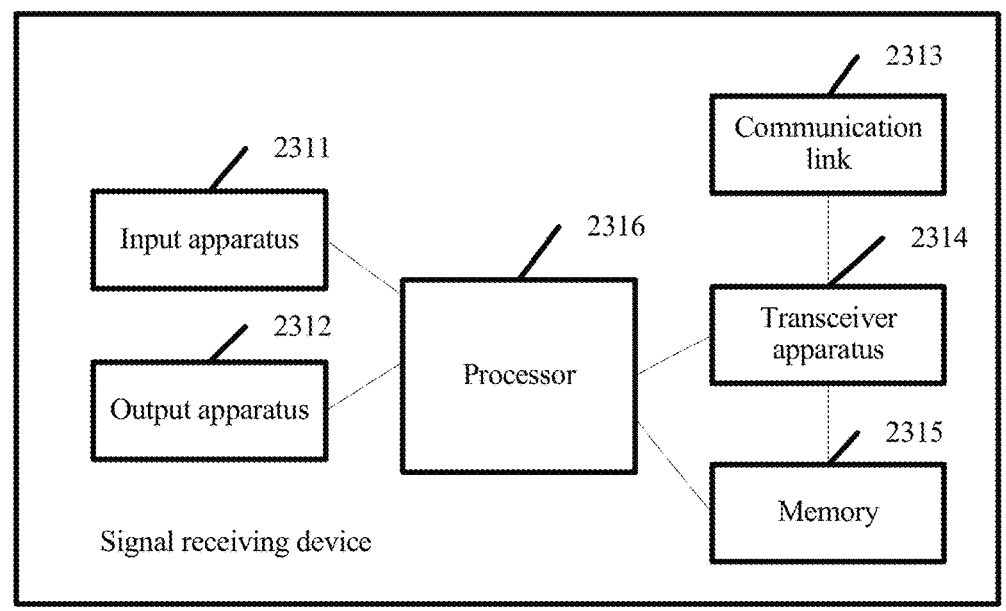
FIG. 23 is a schematic diagram of structural composition of another embodiment of a signal receiving device according to the disclosure.

FIG. 23 is a schematic diagram of structural composition of another embodiment of a signal receiving device according to the disclosure. The device may be configured to implement the signal receiving method in FIG. 15. As shown in FIG. 23, the device may include an input apparatus 2311, an output apparatus 2312, a communication link 2313, a transceiver apparatus 2314, a memory 2315, and a processor 2316.

The input apparatus 2311 is configured to receive input data that is input into the signal sending device from the outside. In specific implementation, the input apparatus 2311 in this embodiment of the disclosure may include a keyboard, a mouse, a photoelectronic input apparatus, a voice input apparatus, a touch-based input apparatus, a scanner, and the like.

The output apparatus 2312 is configured to output output data of the signal sending device to the outside. In specific implementation, the output apparatus 2312 in this embodiment of the disclosure may include a display, a loudspeaker, a printer, and the like.

The communication link 2313 is configured to establish a communication connection between the signal sending device and another device. In specific implementation, the communication link 2313 in this embodiment of the disclosure may be an instance of a propagation medium. The propagation medium may generally substantialize a computer readable instruction, a data structure, a program module, or other data in a form of another modulation data signal (such as a carrier or another transport mechanism). For example, the propagation medium may include a wired media such as a wired network or a direct-wired connection. Alternatively, the propagation medium may include a wired medium such as a sound wave, a radio frequency, or an infrared ray.

The transceiver apparatus 2314 is configured to communicate with the another device by using the communication link 2313, for example, transmitting and receiving data. In specific implementation, the transceiver apparatus 2314 may be an antenna or another transceiver apparatus. A preamble sequence received by the transceiver apparatus 2314 in this embodiment includes a high-efficiency short training field sequence, the high-efficiency short training field sequence is corresponding to a segment of sequence in a high-efficiency training field sequence in a preamble sequence corresponding to a reference bandwidth, a sampling rate of the segment of sequence is a sampling rate corresponding to the current bandwidth, and the reference bandwidth is greater than the current bandwidth.

The memory 2315 is configured to store program data with various functions. In specific implementation, the memory 2315 in this embodiment of the disclosure may be a system memory such as a volatile memory (such as a RAM), a non-volatile memory (such as a ROM and a flash memory), or a combination of a volatile memory and a non-volatile memory. In specific implementation, alternatively, the memory 2315 in this embodiment of the disclosure may be an external memory outside a system, such as a magnetic disk, a disc, or a magnetic tape.

The processor 2316 is configured to call the program data stored in the memory 2315 to execute the following operation:

receiving the preamble sequence from the transceiver apparatus 2314.

In some feasible implementation manners, the segment of sequence in this embodiment includes at least one cycle.

In some feasible implementation manners, the current bandwidth in this embodiment is 20 MHz, and the high-efficiency short training field sequence included in the preamble sequence corresponding to the current bandwidth has duration of 4 µs, includes 80 sampling points, and is corresponding to a sampling rate of 50 ns;

the reference bandwidth is any one of 40 MHz, 80 MHz, or 160 MHz;

a high-efficiency short training field sequence included in a preamble sequence corresponding to the reference bandwidth of 40 MHz has duration of 4 µs, includes 160 sampling points, and is corresponding to a sampling rate of 25 ns;

a high-efficiency short training field sequence included in a preamble sequence corresponding to the reference bandwidth of 80 MHz has duration of 4 µs, includes 320 sampling points, and is corresponding to a sampling rate of 12.5 ns; and a high-efficiency short training field sequence included in a preamble sequence corresponding to the reference bandwidth of 160 MHz has duration of 4 µs, includes 640 sampling points, and is corresponding to a sampling rate of 6.25 ns.

In some feasible implementation manners, the current bandwidth in this embodiment is 20 MHz, and the high-efficiency short training field sequence included in the preamble sequence corresponding to the current bandwidth has duration of 3.2 µs, includes 64 sampling points, and is corresponding to a sampling rate of 50 ns;

the reference bandwidth is any one of 40 MHz, 80 MHz, or 160 MHz;

a high-efficiency short training field sequence included in a preamble sequence corresponding to the reference bandwidth of 40 MHz has duration of 3.2 µs, includes 128 sampling points, and is corresponding to a sampling rate of 25 ns;

a high-efficiency short training field sequence included in a preamble sequence corresponding to the reference bandwidth of 80 MHz has duration of 3.2 µs, includes 256 sampling points, and is corresponding to a sampling rate of 12.5 ns; and a high-efficiency short training field sequence included in a preamble sequence corresponding to the reference bandwidth of 160 MHz has duration of 43.2 µs, includes 512 sampling points, and is corresponding to a sampling rate of 6.25 ns.

In some feasible implementation manners, the current bandwidth in this embodiment is 40 MHz, and the high-efficiency short training field sequence included in the preamble sequence corresponding to the current bandwidth has duration of 4 µs, includes 160 sampling points, and is corresponding to a sampling rate of 25 ns;

the reference bandwidth is either 80 MHz or 160 MHz;

a high-efficiency short training field sequence included in a preamble sequence corresponding to the reference bandwidth of 80 MHz has duration of 4 µs, includes 320 sampling points, and is corresponding to a sampling rate of 12.5 ns; and a high-efficiency short training field sequence included in a preamble sequence corresponding to the reference bandwidth of 160 MHz has duration of 4 µs, includes 640 sampling points, and is corresponding to a sampling rate of 6.25 ns.

In some feasible implementation manners, the current bandwidth in this embodiment is 40 MHz, and the high-efficiency short training field sequence included in the preamble sequence corresponding to the current bandwidth has duration of 3.2 µs, includes 128 sampling points, and is corresponding to a sampling rate of 25 ns;

the reference bandwidth is either 80 MHz or 160 MHz;

a high-efficiency short training field sequence included in a preamble sequence corresponding to the reference bandwidth of 80 MHz has duration of 3.2 µs, includes 256 sampling points, and is corresponding to a sampling rate of 12.5 ns; and a high-efficiency short training field sequence included in a preamble sequence corresponding to the reference bandwidth of 160 MHz has duration of 43.2 µs, includes 512 sampling points, and is corresponding to a sampling rate of 6.25 ns.

In some feasible implementation manners, the current bandwidth in this embodiment is 80 MHz, and the high-efficiency short training field sequence included in the preamble sequence corresponding to the current bandwidth has duration of 4 µs, includes 320 sampling points, and is corresponding to a sampling rate of 12.5 ns;

the reference bandwidth is 160 MHz; and a high-efficiency short training field sequence included in a preamble sequence corresponding to the reference bandwidth of 160 MHz has duration of 4 µs, includes 640 sampling points, and is corresponding to a sampling rate of 6.25 ns.

In some feasible implementation manners, the current bandwidth in this embodiment is 80 MHz, and the high-efficiency short training field sequence included in the preamble sequence corresponding to the current bandwidth has duration of 3.2 µs, includes 256 sampling points, and is corresponding to a sampling rate of 12.5 ns;

the reference bandwidth is 160 MHz; and a high-efficiency short training field sequence included in a preamble sequence corresponding to the reference bandwidth of 160 MHz has duration of 43.2 µs, includes 512 sampling points, and is corresponding to a sampling rate of 6.25 ns.

In addition, an embodiment of the disclosure further provides a computer storage medium, where the computer storage medium may store a program, and when the program is executed, some or all of the steps of the method described in the embodiments of the disclosure may be performed. In specific implementation, the computer storage medium in this embodiment of the disclosure includes a RAM, a ROM, an EEPROM, a flash memory, a CD-ROM, a DVD or another optical memory, a magnetic tape, a magnetic disk, or another magnetic memory, or any another medium that may be configured to store required information and that may be accessed by a computing device.

Figure 24:
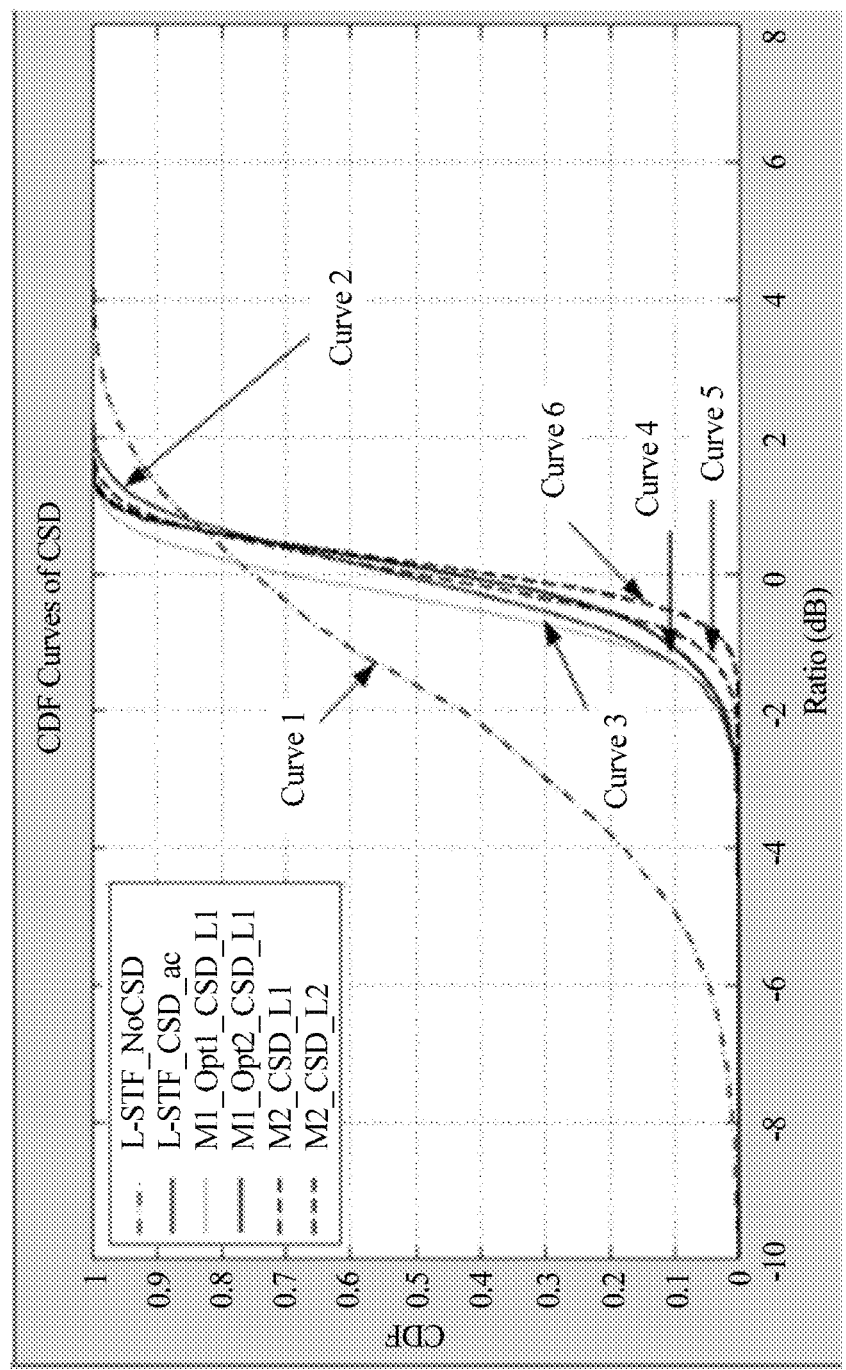
FIG. 24 is a schematic diagram of comparison between AGC performance of a receiver in the technical solutions of the disclosure and AGC performance of a receiver in existing technical solutions.

FIG. 24 is a schematic diagram of comparison between AGC performance of a receiver in the technical solutions of the disclosure and AGC performance of a receiver in existing technical solutions. In FIG. 24, an L-STF represents an STF sequence used for an HT-STF part or a VHT-STF part in a WLAN standard in the prior art. M1_Opt1 and M1₁₃ Opt2 separately represent two types of sequences obtained after frequency domain density of the foregoing sequence 2 and sequence 3 in the disclosure is increased, while M2 represents an STF time domain sequence obtained in a bandwidth of 20 MHz in the disclosure by capturing a time domain sequence in a larger bandwidth.

In FIG. 24, a horizontal coordinate represents a ratio (dB) of power of an STF part to power of a data part in a received signal, and a vertical coordinate represents a cumulative distribution function (CDF) value of the ratio. Three groups of CSD values are used. In the first group, CSD_ac refers to a CSD sequence used in the IEEE 802.11ac standard in the prior art for a VHT-STF part of a preamble sequence and a data part:

CSD_ac: [0, −400, −200, −600, −350, −650, −100, −750].

In the second group and in the third group, CSD_L refers to a CSD sequence whose maximum value is increased:

CSD_L1: [0, −500, −250, −700, −400, −800, −150, −900];

CSD_L2: [0, −800, −400, −1000, −600, −1200, −200, −1400].

It may be learned from a result of FIG. 24 that if a CSD sequence (curve 1) is not used at all, severe mismatch exists between the power of the STF part and the power of the data part. Consequently, a receiver cannot effectively adjust AGC, and overall performance of the receiver is severely affected. According to a solution (curve 2) in an existing standard, a power match degree may be significantly improved. However, it may be learned that, by using the technical solutions (curve 3 to curve 6) of the disclosure, a CDF curve is further improved. In particular, a CDF curve of an STF time domain sequence (curve 5 and curve 6) obtained by capturing a time domain sequence in a larger bandwidth is improved greatly. It may be learned that AGC performance of a receiver in a WLAN system can be effectively improved by using the technical solutions provided in the embodiments of the disclosure.

Obviously, a person skilled in the art can make various modifications and variations to the disclosure without departing from the spirit and scope of the disclosure. The disclosure is intended to cover these modifications and variations provided that they fall within the scope of protection defined by the following claims and their equivalent technologies.

What is claimed is:

1. A signal sending method comprising:
generating a preamble sequence comprising a high-efficiency short training field sequence, wherein the high-efficiency short training field sequence comprises five cycles, wherein the length of each cycle of the five cycles is 1600 ns; and
sending the preamble sequence.

2. The signal sending method according to claim 1, wherein the preamble sequence corresponds to a current bandwidth, and the high-efficiency short training field sequence includes a segment of a high-efficiency short training field sequence in a preamble sequence corresponding to a reference bandwidth, and the high-efficiency short training field sequence in the preamble sequence corresponding to the current bandwidth comprises five cycles, wherein the length of each cycle of the five cycles is 1600 ns; and the method further comprising:
sending the preamble sequence corresponding to the current bandwidth.

3. The signal sending method according to claim 2, wherein a sampling rate of the segment of the high-efficiency short training field sequence in the preamble sequence corresponding to the reference bandwidth corresponds to the current bandwidth.

4. The signal sending method according to claim 2, wherein the current bandwidth is 40 MHz, and the high-efficiency short training field sequence corresponding to 40 MHz is [1*L-STF, j*L-STF], wherein the L-STF is [0,0,0,0,0,0,0,1+1i,0,0,0,−1−1i,0,0,0,1+1i,0,0,0,−1−1i,0,0, 0,−1−1i,0,0,0,1+1i,0,0,0, . . . 0,0,0,−1−1i,0,0,0,−1−1i,0,0,0, 1+1i,0,0,0,1+1i,0,0,0,1+1i,0,0,0,1+1i,0,0,0,0,0,0,0].

5. A signal receiving method comprising:
receiving a preamble sequence comprising a high-efficiency short training field sequence, wherein the high-efficiency short training field sequence comprises five cycles, wherein the length of each cycle of the five cycles is 1600 ns; and processing signals based on the high-efficiency short training field sequence.

6. The signal receiving method according to claim 5, wherein the preamble sequence corresponds to a current bandwidth, and the high-efficiency short training field sequence includes a segment of a high-efficiency short training field sequence in a preamble sequence corresponding to a reference bandwidth, and the high-efficiency short training field sequence in the preamble sequence corresponding to the current bandwidth comprises five cycles, wherein the length of each cycle of the five cycles is 1600 ns; and the method further comprising:

processing signals based on the high-efficiency short training field sequence in the preamble sequence corresponding to the current bandwidth.

7. The signal receiving method according to claim 6, wherein a sampling rate of the segment of the high-efficiency short training field sequence in the preamble sequence corresponding to the reference bandwidth corresponds to the current bandwidth.

8. The signal receiving method according to claim 6, the current bandwidth is 40 MHz, and the high-efficiency short training field sequence corresponding to 40 MHz is [1*L-STF, j*L-STF], wherein the L-STF is [0,0,0,0,0,0,0,0, 1+1i,0,0,0,−1−1i,0,0,0,1+1i,0,0,0,−1−1i,0,0,0,−1−1i,0,0,0, 1+1i,0,0,0, . . . 0,0,0,−1−1i,0,0,0,−1−1i,0,0,0,1+1i,0,0,0, 1+1i,0,0,0,1+1i,0,0,0,1+1i,0,0,0,0,0,0,0].

9. A signal sending device comprising:
a processor configured to generate a preamble sequence comprising a high-efficiency short training field sequence, wherein the high-efficiency short training field sequence comprises five cycles, wherein the length of each cycle of the five cycles is 1600 ns; and
a transmitter configured to cooperate with the processor to send the preamble sequence.

10. The signal sending device according to claim 9, wherein the preamble sequence corresponds to a current bandwidth, wherein the high-efficiency short training field sequence includes a segment of a high-efficiency short training field sequence in a preamble sequence corresponding to a reference bandwidth, and the high-efficiency short training field sequence in the preamble sequence corresponding to the current bandwidth comprises five cycles, wherein the length of each cycle of the five cycles is 1600 ns; and
wherein the transmitter is configured to cooperate with the processor to send the preamble sequence corresponding to the current bandwidth.

11. The signal sending device according to claim 10, wherein a sampling rate of the segment of the high-efficiency short training field sequence in the preamble sequence corresponding to the reference bandwidth corresponds to the current bandwidth.

12. The signal sending device according to claim 10, the current bandwidth is 40 MHz, and the high-efficiency short training field sequence corresponding to 40 MHz is [1*L-STF, j*L-STF], wherein the L-STF is [0,0,0,0,0,0,0,0, 1+1i,0,0,0,−1−1i,0,0,0,1+1i,0,0,0,−1−1i,0,0,0,−1−1i,0,0,0, 1+1i,0,0,0, . . . 0,0,0,−1−1i,0,0,0,−1−1i,0,0,0, 1+1i,0,0,0, 1+1i,0,0,0,1+1i,0,0,0,1+1i,0,0,0,0,0,0,0].

13. A signal receiving device comprising:
a processor; and
a receiver configured to cooperate with the processor to receive a preamble sequence comprising a high-efficiency short training field sequence, wherein the high-efficiency short training field sequence comprises five cycles, wherein the length of each cycle of the five cycles is 1600 ns;
wherein the processor is configured to process signals based on the high-efficiency short training field sequence.

14. The signal receiving device according to claim 13, wherein the preamble sequence corresponds to a current bandwidth, wherein the high-efficiency short training field sequence includes a segment of a high-efficiency short training field sequence in a preamble sequence corresponding to a reference bandwidth, and the high-efficiency short training field sequence in a preamble sequence corresponding to the current bandwidth comprises five cycles, wherein the length of each cycle of the five cycles is 1600 ns; and
wherein the processor is further configured to process signals based on the high-efficiency short training field sequence in the preamble sequence corresponding to the current bandwidth.

15. The signal receiving device according to claim 14, wherein a sampling rate of the segment of the high-efficiency short training field sequence in the preamble sequence corresponding to the reference bandwidth corresponds to the current bandwidth.

16. The signal receiving device according to claim 14, the current bandwidth is 40 MHz, and the high-efficiency short training field sequence corresponding to 40 MHz is [1*L-STF, j*L-STF], wherein the L-STF is [0,0,0,0,0,0,0,0, 1+1i,0,0,0,−1−1i,0,0,0,1+1i,0,0,0,−1−1i,0,0,0,−1−1i,0,0,0, 1+1i,0,0,0, . . . 0,0,0,−1−1i,0,0,0,−1−1i,0,0,0, 1+1i,0,0,0, 1+1i,0,0,0,1+1i,0,0,0,1+1i,0,0,0,0,0,0,0].

* * * * *